(12) United States Patent
Gale et al.

(10) Patent No.: US 11,922,010 B2
(45) Date of Patent: Mar. 5, 2024

(54) PROVIDING CONTEXTUAL INFORMATION WITH KEYBOARD INTERFACE FOR MESSAGING SYSTEM

(71) Applicant: Snap Inc., Santa Monica, CA (US)

(72) Inventors: Maxwell Gale, New York, NY (US); Christie Marie Heikkinen, Santa Monica, CA (US); David Phillip Taitz, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 213 days.

(21) Appl. No.: 16/946,136

(22) Filed: Jun. 8, 2020

(65) Prior Publication Data

US 2021/0382616 A1   Dec. 9, 2021

(51) Int. Cl.
*G06F 3/04886* (2022.01)

(52) U.S. Cl.
CPC .............................. *G06F 3/04886* (2013.01)

(58) Field of Classification Search
CPC .. G06F 3/04886; G06F 40/274; G06F 3/0237; H04M 1/72436; H04M 1/72439; H04M 1/7243; H04M 15/8077; H04M 15/844; H04N 1/00307; A63F 2300/537; H04L 51/02; H04L 51/10; H04L 51/04; H04L 51/32; H04L 51/52
See application file for complete search history.

(56) References Cited

U.S. PATENT DOCUMENTS

| | | | |
|---|---|---|---|
| 5,880,731 A | 3/1999 | Liles et al. | |
| 6,023,270 A | 2/2000 | Brush, II et al. | |
| 6,223,165 B1 | 4/2001 | Lauffer | |
| 6,772,195 B1 | 8/2004 | Hatlelid et al. | |
| 6,842,779 B1 | 1/2005 | Nishizawa | |
| 7,342,587 B2 | 3/2008 | Danzig et al. | |
| 7,468,729 B1 | 12/2008 | Levinson | |
| 7,636,755 B2 | 12/2009 | Blattner et al. | |
| 7,639,251 B2 | 12/2009 | Gu et al. | |
| 7,775,885 B2 | 8/2010 | Van Luchene et al. | |

(Continued)

FOREIGN PATENT DOCUMENTS

| | | |
|---|---|---|
| CN | 109863532 | 6/2019 |
| CN | 110168478 | 8/2019 |

(Continued)

*Primary Examiner* — David S Posigian
(74) *Attorney, Agent, or Firm* — Schwegman Lundberg & Woessner, P.A.

(57) ABSTRACT

Aspects of the present disclosure involve a device comprising a computer-readable storage medium storing a program and method for providing contextual information with a keyboard interface. The program and method provide for receiving a media content item provided by a second device; displaying, on a screen of the device, the media content item together with a reply element, the reply element being user-selectable to generate a reply message with respect to the media content item; receiving user selection of the reply element; and in response to receiving the user selection, displaying, in a first preset area of the screen, a keyboard interface for user selection of text to include in the reply message, and displaying, in a second preset area of the screen, a context information interface which is user-selectable to provide information corresponding to at least one type of context associated with the media content item.

16 Claims, 16 Drawing Sheets

(56) References Cited

U.S. PATENT DOCUMENTS

| | | |
|---|---|---|
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,880,735 B2 * | 1/2018 | Dascola .............. G06F 3/04883 |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2005/0251555 A1 * | 11/2005 | Little ................... H04L 69/329 |
| | | 709/206 |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0234207 A1 * | 10/2007 | Turakhia .............. G06Q 10/107 |
| | | 705/14.54 |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0248757 A1 * | 9/2010 | Baek ....................... H04W 4/14 |
| | | 704/9 |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2011/0295852 A1 * | 12/2011 | Wang .................. G06F 16/9535 |
| | | 707/E17.014 |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2014/0237382 A1 * | 8/2014 | Grandhi ................ G06F 3/0487 |
| | | 715/752 |
| 2014/0365949 A1 * | 12/2014 | Xia ....................... G06F 40/274 |
| | | 715/780 |
| 2015/0172144 A1 * | 6/2015 | Karoubi .................. H04L 51/02 |
| | | 715/752 |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |

(56) References Cited

U.S. PATENT DOCUMENTS

| | | |
|---|---|---|
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0083901 A1* | 3/2018 | McGregor, Jr. ......... H04L 51/10 |
| 2018/0113587 A1 | 4/2018 | Allen et al. |
| 2018/0115503 A1 | 4/2018 | Baldwin et al. |
| 2018/0217864 A1* | 8/2018 | Kumar ..................... G06F 9/48 |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |

FOREIGN PATENT DOCUMENTS

| | | |
|---|---|---|
| EP | 2184092 | 5/2010 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |

* cited by examiner

PROVIDING CONTEXTUAL INFORMATION WITH KEYBOARD INTERFACE FOR MESSAGING SYSTEM

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS in the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

A messaging system allows a user to exchange media content items (e.g., messages with media content, collections of media content) with one another. The messaging system as described herein may implement or otherwise work in conjunction with a context system configured to provide contextual content associated with a media content item.

The disclosed embodiments provide for a client device to display a media content item together with a reply element (e.g., a reply button) for generating a reply message with respect to the media content item. In response to user selection of the reply element, the client device displays a keyboard interface at a first preset area (e.g., bottom portion) of a device screen, and one or more context cards at a second preset area (e.g., a top portion) of the screen. The context cards may include supplemental information associated with the media content item. By virtue of presenting the keyboard interface and context card(s) on the same screen, it is possible to facilitate messaging while providing an end user with contextual information regarding the media content item.

Figure 1:
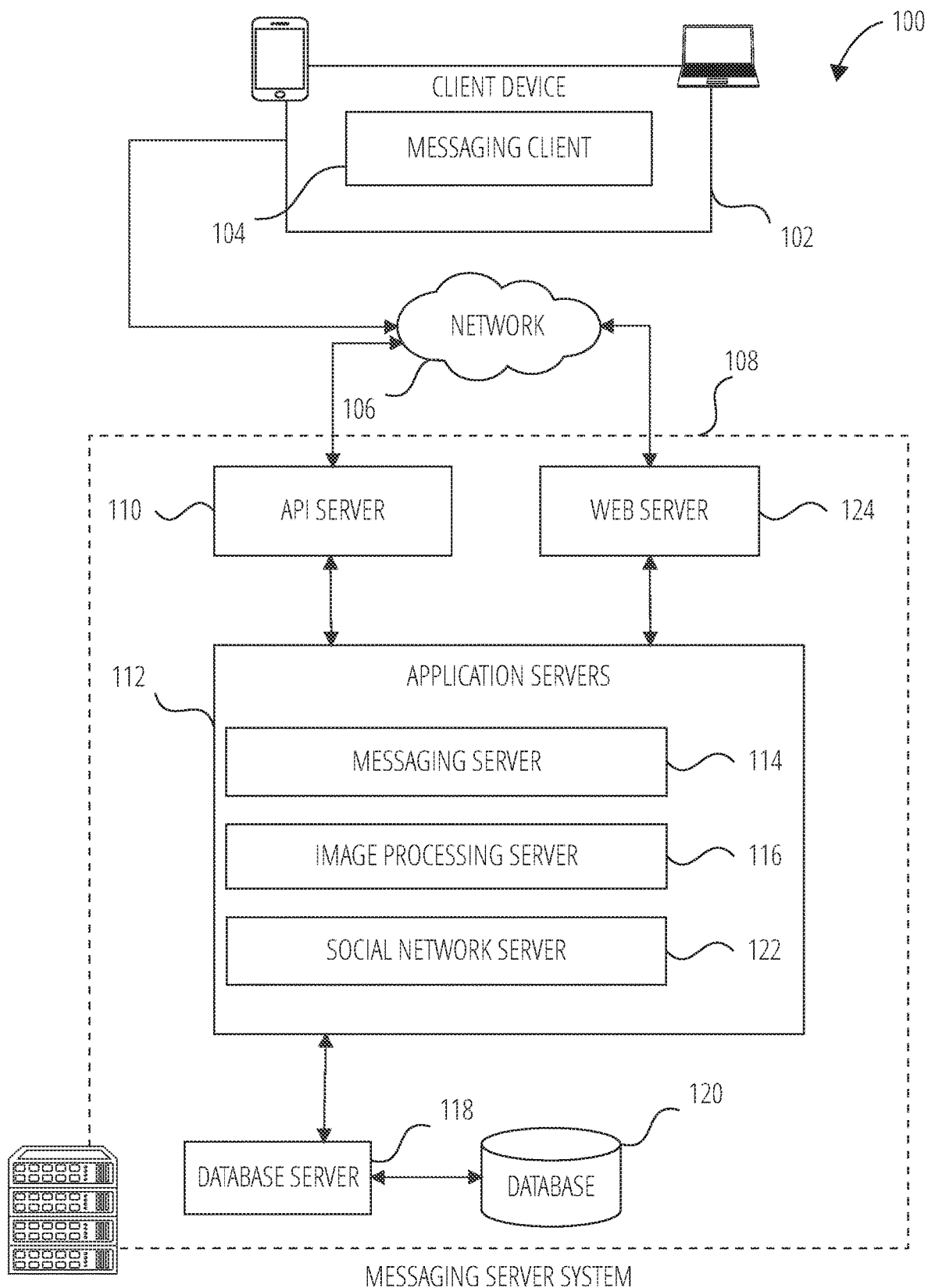
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., Story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called Stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114.

Figure 3:
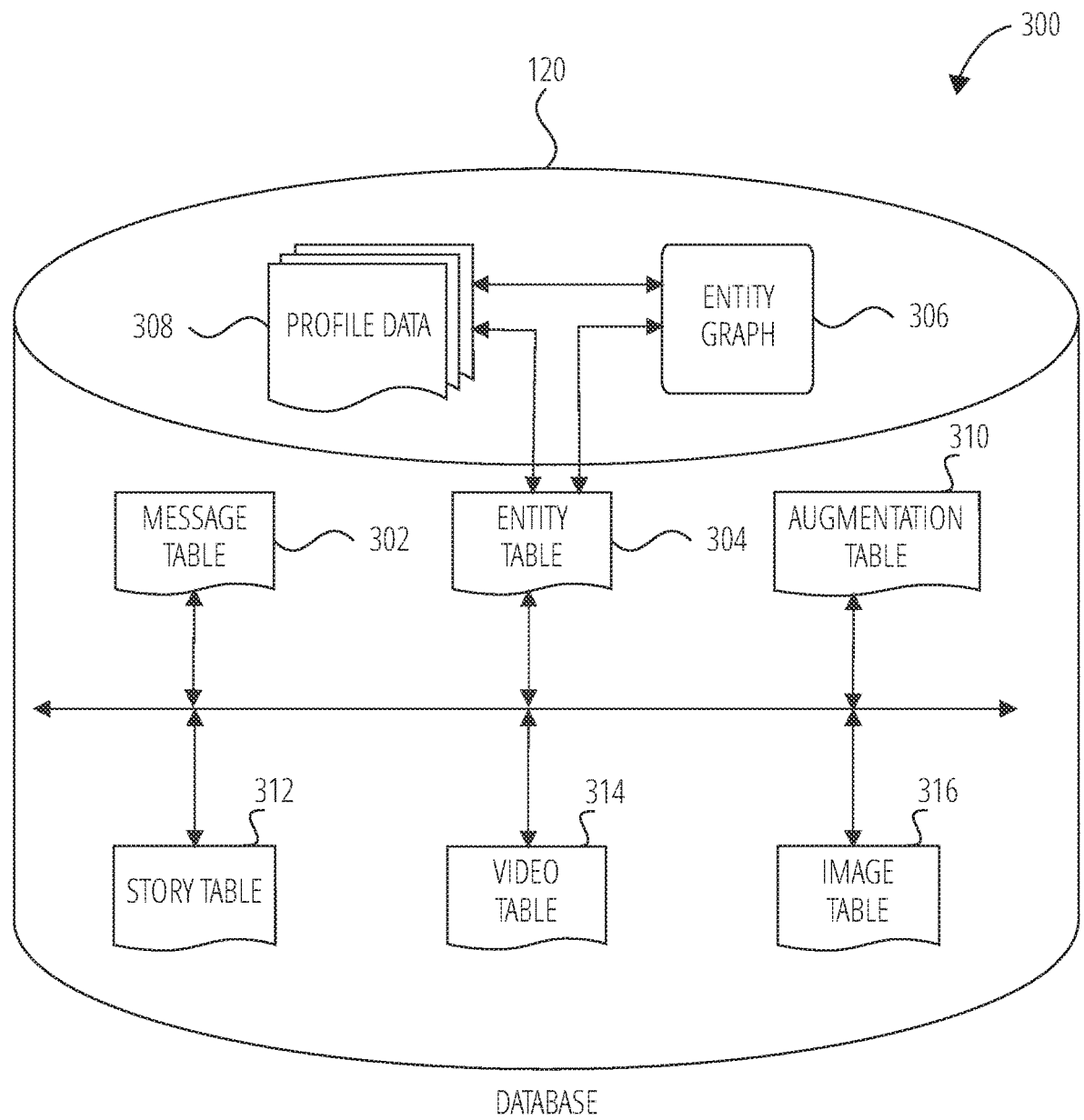
FIG. 3 is a diagrammatic representation of a data structure as maintained in a database, in accordance with some example embodiments.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has relationships or is "following," and also the identification of other entities and interests of a particular user.

Figure 2:
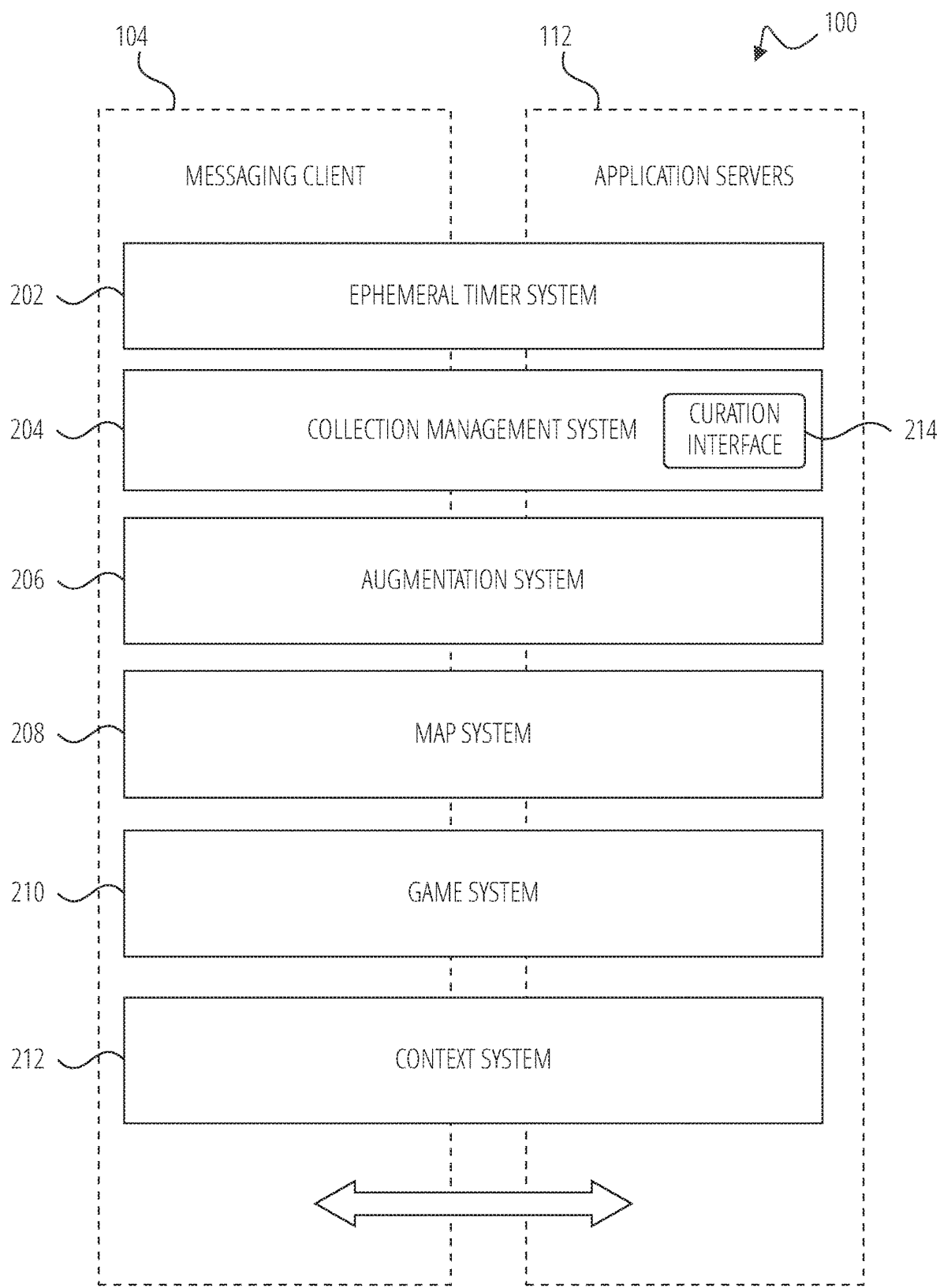
FIG. 2 is a diagrammatic representation of a messaging system that has both client-side and server-side functionality, in accordance with some example embodiments.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104 and on the server-side by the application servers 112. These subsystems include, for example, an ephemeral timer system 202, a collection management system 204, an augmentation system 206, a map system 208, a game system 210 and/or a context system 212.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a Story), selectively, enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client 104.

The collection management system 204 furthermore includes a curation interface 214 that allows a collection manager to manage and curate a particular collection of content. For example, the curation interface 214 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 308) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The context system 212 provides various functions for providing contextual content associated with a media content item (e.g., a message with media content, a Story, etc.).

In one more implementations, the context system 212 provides for specifying types of context that may be associated with a media content item.

For example, the different types of context include, but are not limited to: a request (e.g., where the media content item corresponds to a request, such as a friend request); an invitation to a group/event chat (e.g., where the media content item corresponds to the invitation); an invitation to a private Story (e.g., where the media content item corresponds to the invitation); commerce (e.g., where the media content item corresponds to commerce, such as an on-line purchase); a non-sponsored attachment (e.g., where the media content item includes the attachment), a game (e.g., where the media content item corresponds to initiating/playing a game via the game system 210); a user profile (e.g., where the media content item references another user account via the social network server 122); music (e.g., where the media content item includes music or other audio content); augmented reality content (e.g., where the media content item includes an augmented reality content item, described below with respect to FIG. 3); a venue (e.g., where the media content item references a venue), a sponsored attachment (e.g., where the media content item includes the attachment); and/or a third-party application (e.g., where the media content item references content from and/or links to a third-party application).

In addition to defining the types of context, the context system 212 provides for generating and displaying context information interfaces (e.g., context cards). In one or more embodiments, each context card provides supplemental information with respect to a type of context associated with the media content item. Using the above-listed types of context as an example, the supplemental information for a context card may relate to a respective request, invitation to a group/event chat, invitation to a private Story, commerce, attachment, game, referenced user profile, music, augmented reality content item, venue, sponsored attachment, and/or third-party application associated with a media content item.

In one or more embodiments, context cards may be presented together with display of the media content item. Moreover, one or more context cards may be user-selectable (e.g., via a tap gesture), for example, to access an image, video, sound, text; hyperlink, animation; third party application, or any other suitable content.

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations), if any. A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 308 for the group may similarly include one or more avatar representations associated with the group, in addition to the group name, members, and various settings (e.g., notifications) for the relevant group.

The database 120 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects ((e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on the client device 102 and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client application 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a Story or a gallery). The creation of a particular collection may be initiated by a particular user (e.g., each user for which a record is maintained in the entity table 304). A user may create a "personal Story" in the form of a collection of content that has been created and sent/broadcast by that user. To this end, the user interface of the messaging client 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from varies locations and events. Users whose client devices have location services enabled and are at a common location event at a particular time may, for example, be presented with an option, via a user interface of the messaging client 104, to contribute content to a particular live Story. The live Story may be identified to the user by the messaging client 104, based on his or her location. The end result is a "live Story" told from a community perspective.

A further type of content collection is known as a "location Story," which enables a user whose client device 102 is located within a specific geographic location (e.g., on a college or university campus) to contribute to a particular collection. In some examples, a contribution to a location Story may require a second degree of authentication to verify that the end user belongs to a specific organization or other entity (e.g., is a student on the university campus).

As mentioned above, the video table 314 stores video data that, in one example, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Figure 4:
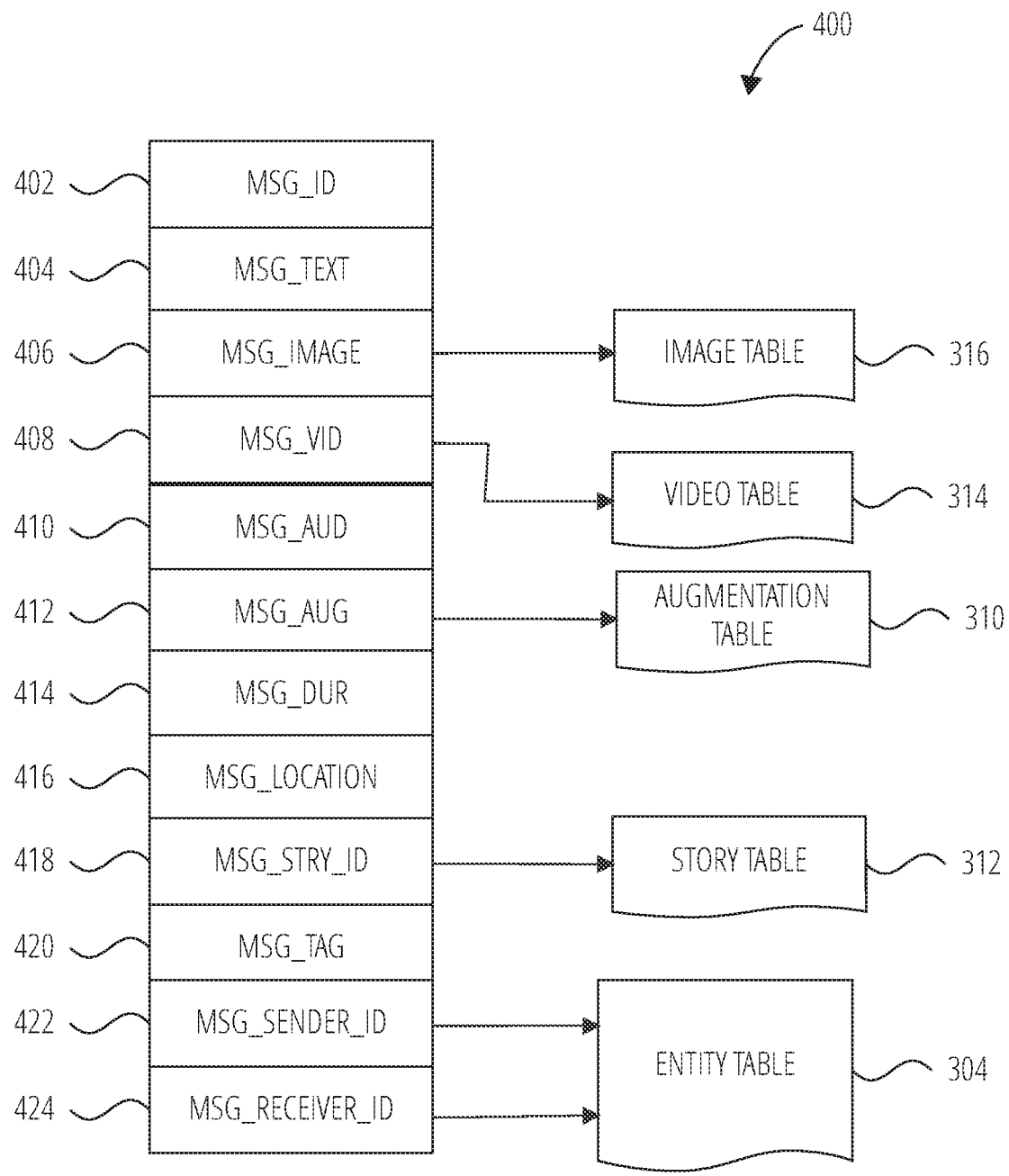
FIG. 4 is a diagrammatic representation of a message, in accordance with some example embodiments.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. A message 400 is shown to include the following example components:
- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 316.
- message video payload 408: video data, captured by a camera component or retrieved from a memory component of the client device 102, and that is included in the message 400. Video data for a sent or received message 400 may be stored in the video table 314.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "Stories" identified in the story table 312) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Figure 5:
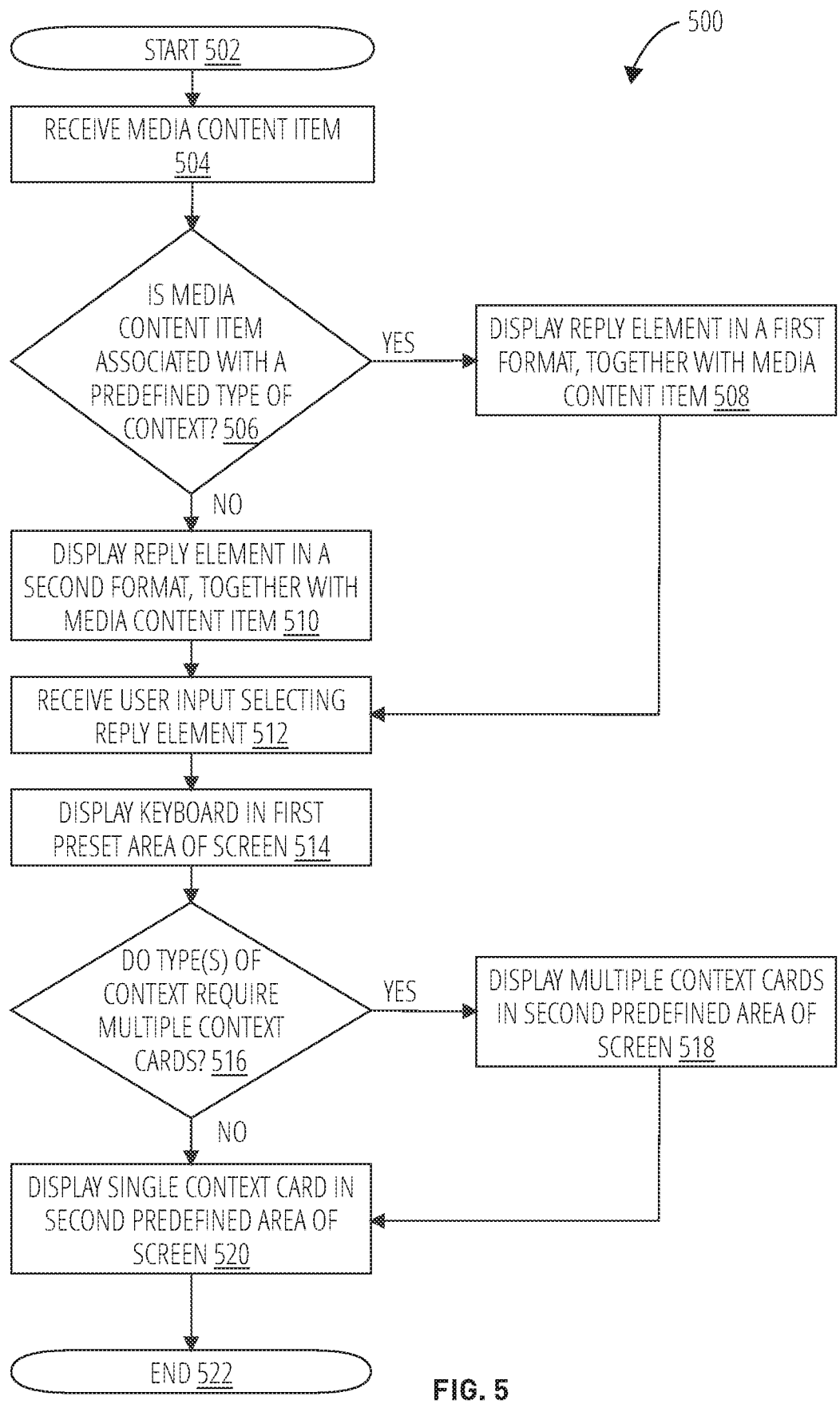
FIG. 5 is flowchart illustrating a process for providing contextual information with a keyboard interface, in accordance with some example embodiments.

FIG. 5 is flowchart illustrating a process 500 for providing contextual information with a keyboard interface, in accordance with some example embodiments. For explanatory purposes, the process 500 is primarily described herein with reference to the messaging client 104 of the client device 102, and the messaging server system 108 of FIG. 1. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its blocks (or operations) are completed. In addition, the process 500 may correspond to a method, a procedure, an algorithm, etc.

As described herein, the messaging client 104 is configured to display a media content item, together with a reply element (e.g., reply button) which is user-selectable to generate a reply message with respect to the media content item. In response to user selection of the reply element, the messaging client 104 displays a keyboard interface at a first preset area (e.g., bottom portion) of a screen of the client device 102. The messaging client 104 further displays a context information interface (e.g., one or more context cards with supplemental information associated with the media content item) at a second preset area (e.g., a top portion which is above the bottom portion) of the screen. By virtue of presenting both interfaces on the same screen, it is possible to facilitate messaging while providing an end user with contextual information that is generally helpful to an end user.

Following start block 502, the messaging client 104 running on the client device 102 (e.g., a first device) receives a media content item (block 504). For example, the media content item may have been provided by another messaging client 104 running on another client device 102 (e.g., a second device). The first and second devices may be associated with a respective first user and second user of the messaging server system 108. For example, the first user may be associated with a first user account of the messaging server system 108, and the second user may be associated with a second user account of the messaging server system 108. As noted above, the first and second users may be identified by the messaging server system 108 based on unique identifiers (e.g., a messaging system identifier, email address and/or a device identifier) associated with respective user accounts for the first and second users. In addition, the messaging server system 108 may implement and/or work in conjunction with the social network server 122 which is configured to identify other users (e.g., friends) with which a particular user has relationships.

In one or more embodiments, the media content item may correspond to a message (e.g., with media content) or a Story (e.g., a collection of media content) that was directly sent by the second user to the first user via the messaging server system 108. In another example, the media content item corresponds to a Story broadcast by the second user, and selected for viewing by the first user via the messaging server system 108.

The media content item may be associated with a predefined (e.g., or prioritized) type of context. As noted above with respect to FIG. 2, the context system 212 specifies different types of context for a media content item, including a request, invitation to a group/event chat, invitation to a private Story, commerce, a non-sponsored attachment, game, referenced user profile, music, augmented reality content item, venue, sponsored attachment and/or third-party application.

In addition, the context system 212 may be configured to prioritize a subset of the types of context, in one or more embodiments, the prioritized subset may predefined. For example, the prioritized subset may be specified by an administrator (e.g., or other authorized user) of the messaging system 100. In one example, the prioritized subset includes the following types of context: commerce, a non-sponsored attachment, a game, and a referenced user profile. However, it is possible for the prioritized subset to include a different selection, combination and/or number of types of context (e.g., as specified by an administrator).

Thus, at decision block 506, the messaging client 104 determines whether the media content item is associated with a predefined (e.g., prioritized) type of context. For example, the messaging client 104 determines whether any of the types of context associated with the media content item are included in the above-described set of predefined (e.g., prioritized) types of context. If so, the messaging client 104 displays a reply element in a first format, together with display of the media content item (block 508). As described herein, a reply element corresponds to an interface element, such as a button, icon, and/or other graphical element, which is user-selectable for generating a reply message (e.g., to the media content item).

As discussed further below with respect to FIG. 10, if the type of context is prioritized, the messaging client 104 may prioritize display of a context interaction element (e.g., for interacting the media content item) over display of the reply element (e.g., for generating a reply message). Thus, the reply element may be displayed as a less prominent (e.g., smaller) icon/button, and may be positioned in a bottom corner (e.g., left corner) of the device screen. The context interaction element may be displayed as a more prominent (e.g., larger) icon/button, and may be positioned in a bottom center of the device screen.

On the other hand, in a case where the media content item is not associated with the predefined (e.g., prioritized) type of context per decision block 506, the messaging client 104 displays the reply element in a second format, together with display of the media content item (block 510). As discussed further below with respect to FIG. 6, if the type(s) of context are not prioritized, the messaging client 104 may prioritize display of the reply element (e.g., for generating a reply message) over display of other interface elements for interacting with the media content item. Thus, the reply element may be displayed as more prominent (e.g., larger) icon/button, and may be positioned in a bottom center of the device screen. Other interface elements may be displayed as less prominent (e.g., smaller) icons/buttons, and may be positioned in bottom corner(s) of the device screen.

At block 512, the messaging client 104 receives user input (e.g., a tap gesture, a swipe up gesture and/or another predefined gesture) selecting the reply element. In response to user selection of the reply element, the messaging client 104 displays an interface for generating the reply message.

As discussed below with respect to FIG. 7 and FIG. 11, the interface may include a keyboard interface, an input box and/or additional interfaces for generating the reply message.

Thus, the messaging client 104 displays the keyboard interface in a first preset area of the device screen (block 514). The first preset area may be at a bottom portion (e.g., bottom half or bottom third) of the device screen. In one or more embodiments, the keyboard interface is displayed as an overlay with respect to the media content item.

In addition to display of keyboard interface (e.g., and other interfaces for generating the reply message), the messaging client 104 displays a context information interface positioned at a second preset area of the device screen. The second preset area may be a top portion (e.g., top half) of the device screen. In one or more embodiments, the context information interface is displayed as an overlay with respect to the media content item.

As discussed below with respect to FIG. 7 and FIG. 11, the context information interface may correspond to one or more context cards. For example, when a media content item is associated with multiple types of context, the messaging client 104 is configured to display a respective context card for each type of context. Alternatively, the media content item may be associated with a single type of context with supplemental information displayed across multiple context cards. For example, as discussed below with respect to FIG. 9, a venue type of context may generally include supplemental information displayed across multiple context cards. On the other hand, some single types of context may generally include supplemental information for display on a single context card (e.g., per FIG. 11 below).

Thus, at decision block 516, the messaging client 104 determines whether the type(s) of context associated with the media content item are to be displayed as multiple context cards (e.g., based on whether the media content item is associated with multiple types of context and/or a single context represented by multiple context cards). If so, at block 518, the messaging client 104 displays the multiple context cards within the second preset area of the screen (e.g., the top portion). As discussed below with respect to FIG. 7, the context cards may be displayed in a collapsed manner, such as a stack. User selection of the stack may cause the messaging client 104 to expand the context cards (e.g., so as to be displayed in a column or row) and to remove the keyboard interface from the display screen, as discussed below with respect to FIG. 8.

Figure 6:
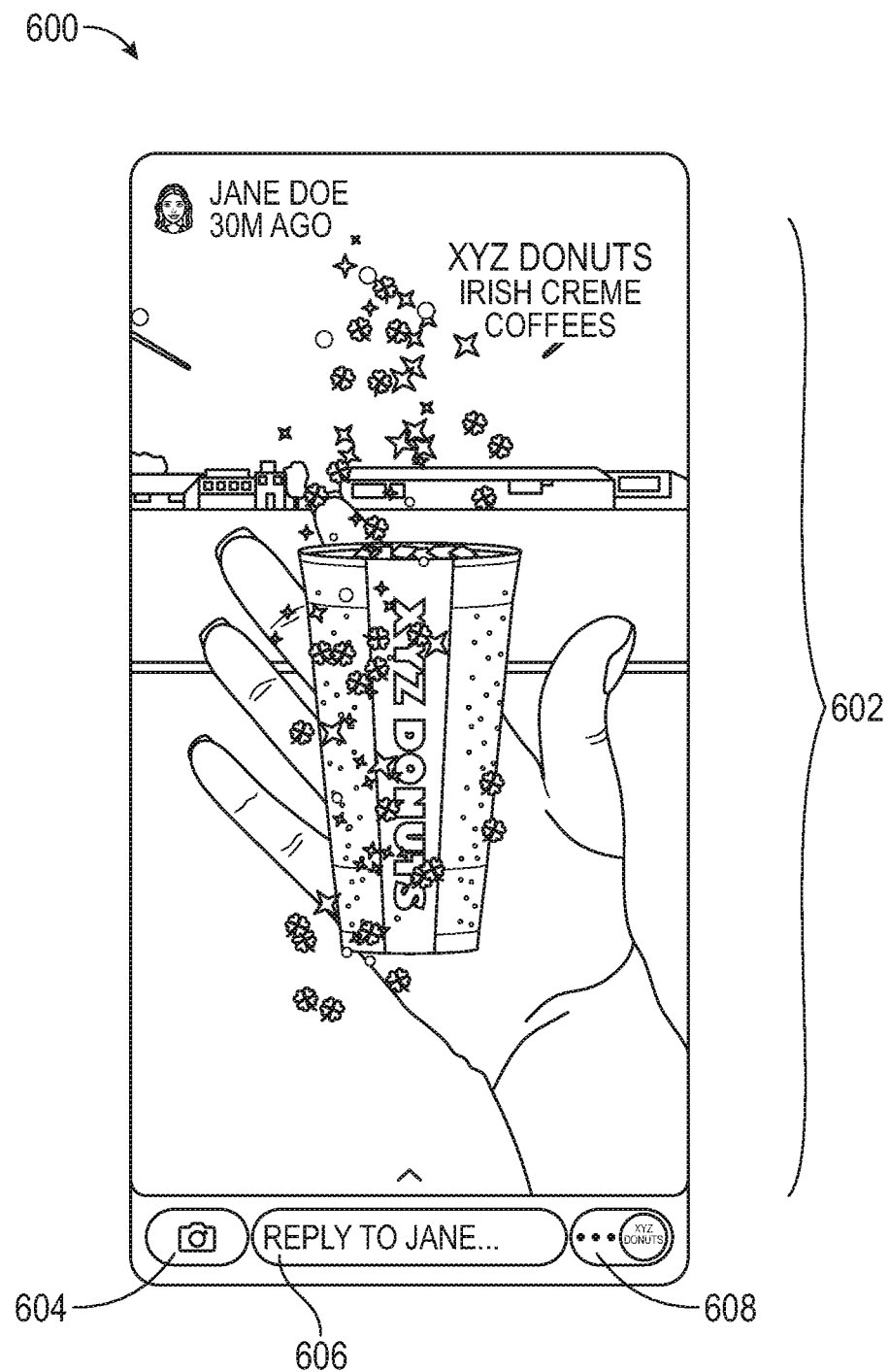
FIG. 6 illustrates an example user interface for displaying a media content item and a first format for a reply element, in accordance with some example embodiments.

In a case where the type of context associated the media content item is to be displayed as a single context care per decision block 516, the messaging client 104 displays the single context card within the second preset area of the screen (e.g., the top portion) at block 520. The process 500 ends at end block 522, FIG. 6 illustrates an example user interface 600 for displaying a media content item, together with a reply element in a first format, in accordance with some example embodiments. In the example of FIG. 6, the user interface 600 includes a media content item 602, an image capture element 604, a reply element 606 and an additional action(s) element 608.

The media content item 602 is displayed by the messaging client 104 running on the client device 102 (e.g., of a first user). The media content item 602 corresponds to a message (e.g., with media content) or a Story (e.g., a collection of media content), for example, provided by a second user.

The reply element 606 is displayed in a first format. As discussed above, the first format may correspond to a prominent (e.g., large) icon/button positioned in a bottom center of the screen of the client device 102. The reply element 606 may be user-selectable via a predefined gesture, such as a tap gesture and/or a swipe up gesture (e.g., in association with a chevron icon as shown in FIG. 6).

In response to user selection of the reply element 606, the messaging client 104 displays a keyboard interface together with context cards. As discussed below with respect to the example of FIG. 7, the media content item 602 is associated with two types of context (e.g., a sponsored advertisement and an augmented reality content item), each of which are represented by a respective context card.

As noted, the user interface 600 further includes the image capture element 604. The image capture element 604 is user-selectable for activating a device camera to capture an image/video. For example, the captured image/video may be used by the first user to generate a message with media content, for sending to the second user.

In addition, the additional action(s) element 608 is user-selectable for performing one or more actions other than generating a reply message) with respect to the media content item 602. One example of such action is displaying information about the second user (e.g., who provided the media content item). In addition, the additional action(s) element 608 may be used to display one or both of the above-mentioned context cards (e.g., sponsored advertisement and/or augmented reality content item), but without presentation of the keyboard interface 704.

Figure 7:
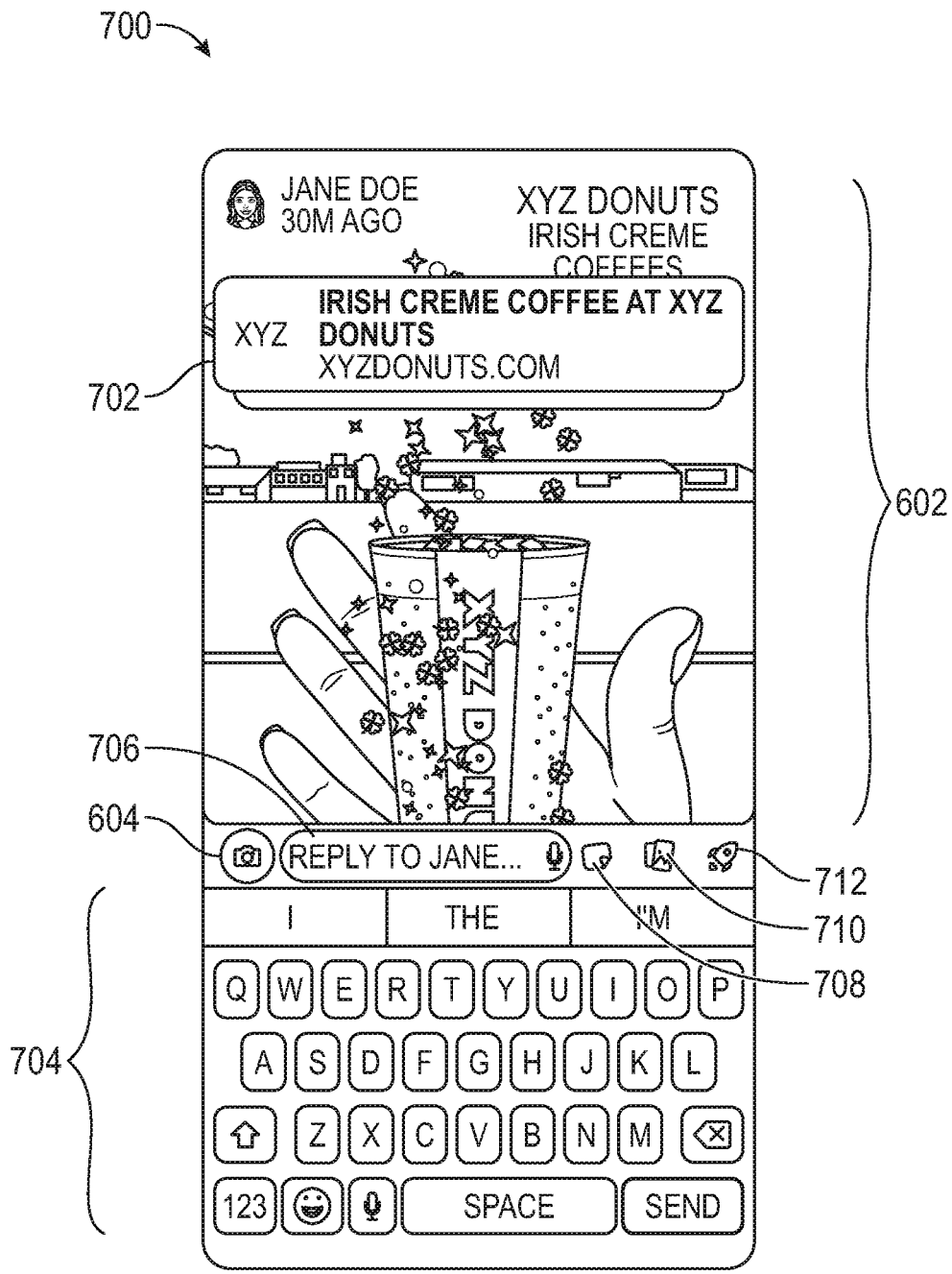
FIG. 7 illustrates an example user interface for displaying a keyboard interface together with collapsed context cards corresponding to multiple types of context, in accordance with some example embodiments.

FIG. 7 illustrates an example user interface 700 for displaying a keyboard and collapsed context cards corresponding to multiple types of context, in accordance with some example embodiments. In one or more embodiments, the user interface 700 is displayed in response to user selection of the reply element 606 in FIG. 6.

The user interface 700 includes contextual information displayed as collapsed context cards 702. As noted above with respect to FIG. 6, the media content item 602 has two types of context associated therewith. In particular, the media content item 602 has a sponsored advertisement (e.g., a coffee advertisement) as a first type of context, and an augmented reality content item (e.g., a sparkle effect) as a second type of context. As described herein, other media content items may have fewer or more types of context associated therewith.

In FIG. 7, supplemental information corresponding to the two types of context is displayed as the respective collapsed context cards 702 (e.g., a stack of context cards). In one or more embodiments, the collapsed context cards 702 are presented in order (e.g., based on ranking(s) specified by an administrator), such that the highest-ranked card is displayed at the top of the stack.

The user interface 700 further includes an input box 706 configured for user input of message content to include in a reply message. For example, the user input may be provided by one or more of: a keyboard interface 704 for user input of text within the input box 706; the image capture element 604 for activating the device camera to capture an image/video for including in a message with media content; a sticker selection element 708 for selecting from among a set of available stickers (e.g., generic stickers or personalized avatar-based stickers) to include in a reply message; a photo selection element 710 for selecting an image/video selected from a photo library associated with the first user; and/or a game selection element 712 for selecting and/or initiating a game between the first user and the second user.

In one or more embodiments, the keyboard interface 704 is displayed in a first preset area corresponding to a bottom part of the screen the client device 102. On the other hand, the collapsed context cards 702 are displayed in a second preset area corresponding to a top part of the screen.

Figure 8:
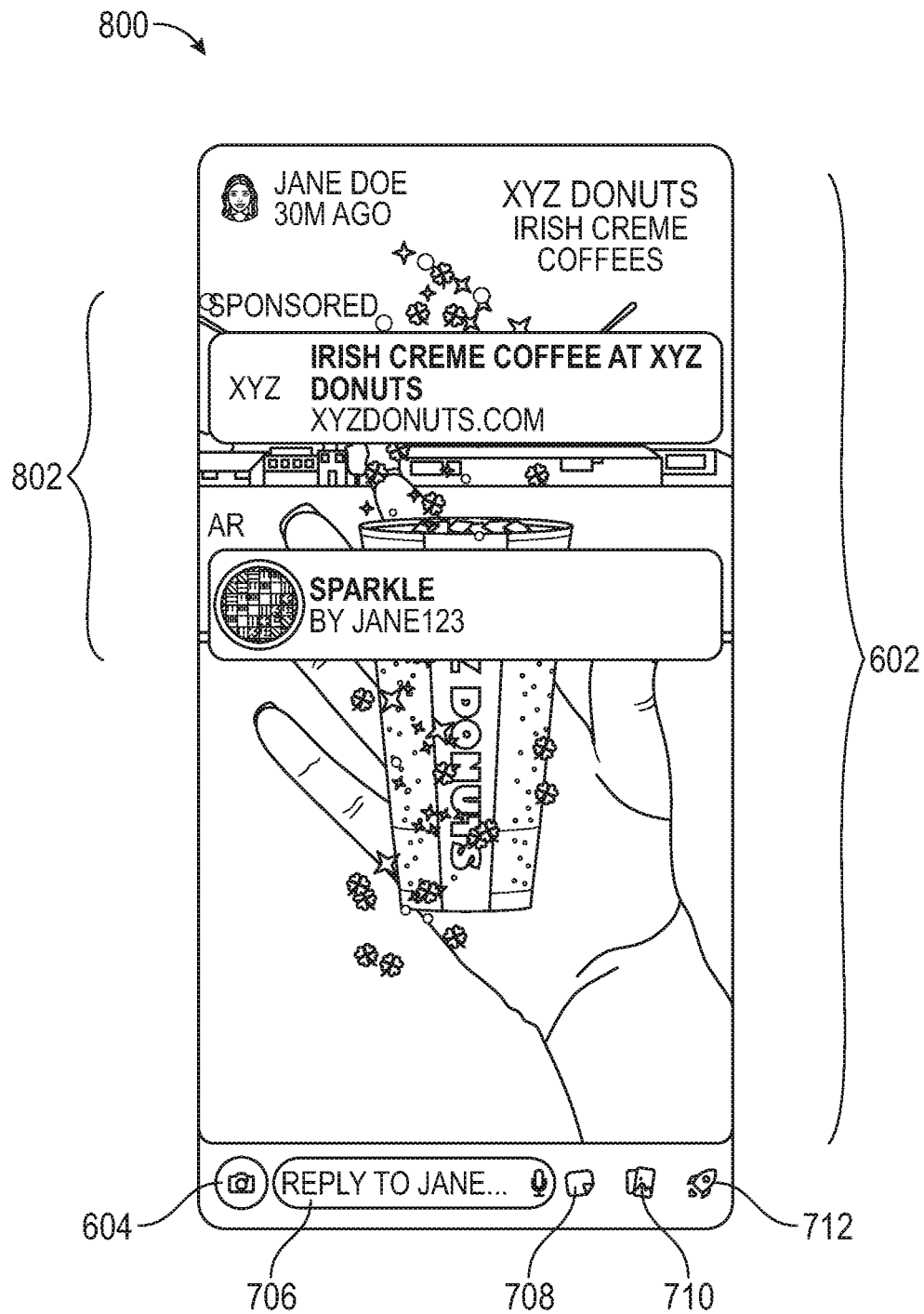
FIG. 8 illustrates an example user interface for displaying expanded context cards corresponding to multiple types of context, in accordance with some example embodiments.

FIG. 8 illustrates an example user interface 800 for displaying expanded context cards corresponding to multiple types of context, in accordance with some example embodiments. In one or more embodiments, the user interface 800 is displayed in response to user selection of the collapsed context cards 702 of FIG. 7.

As shown in FIG. 8, in response to such user selection, the messaging client 104 changes display of the collapsed context cards 702 (e.g., a stack) to expanded context cards 802. The expanded context cards 802 include a first context card with supplemental information for a sponsored advertisement (e.g., a coffee advertisement), and a second context card with supplemental information for an augmented reality content item (e.g., a rainbow sparkle effect). One or more of the expanded context cards 802 may be user-selectable (e.g., via a tap gesture), for example, to access an image, video, sound, text, hyperlink, animation, third party application, or any other suitable content related to the context card.

In the example of FIG. 8, the expanded context cards 802 are shown as including a header (e.g., "Sponsored" and "AR content") positioned in a column. However, other arrangements of the expanded cards can include a row of context cards, a grid of context cards, or another expanded arrangement of the context cards. Moreover, the context cards may be arranged in order based on the above-noted ranking for the types of context cards.

In addition, the messaging client 104 provides for removing the keyboard interface from the screen. In one or more embodiments, the transition between the collapsed context cards 702 with the keyboard interface 704 of FIG. 7 to the expanded context cards 802 without a keyboard interface of FIG. 8 is animated, for example, to show the expansion of the collapsed context cards 702 (e.g., stack) and/or the removal of the keyboard interface 704 (e.g., where the keyboard is animated to slide downwards off the screen).

Figure 9:
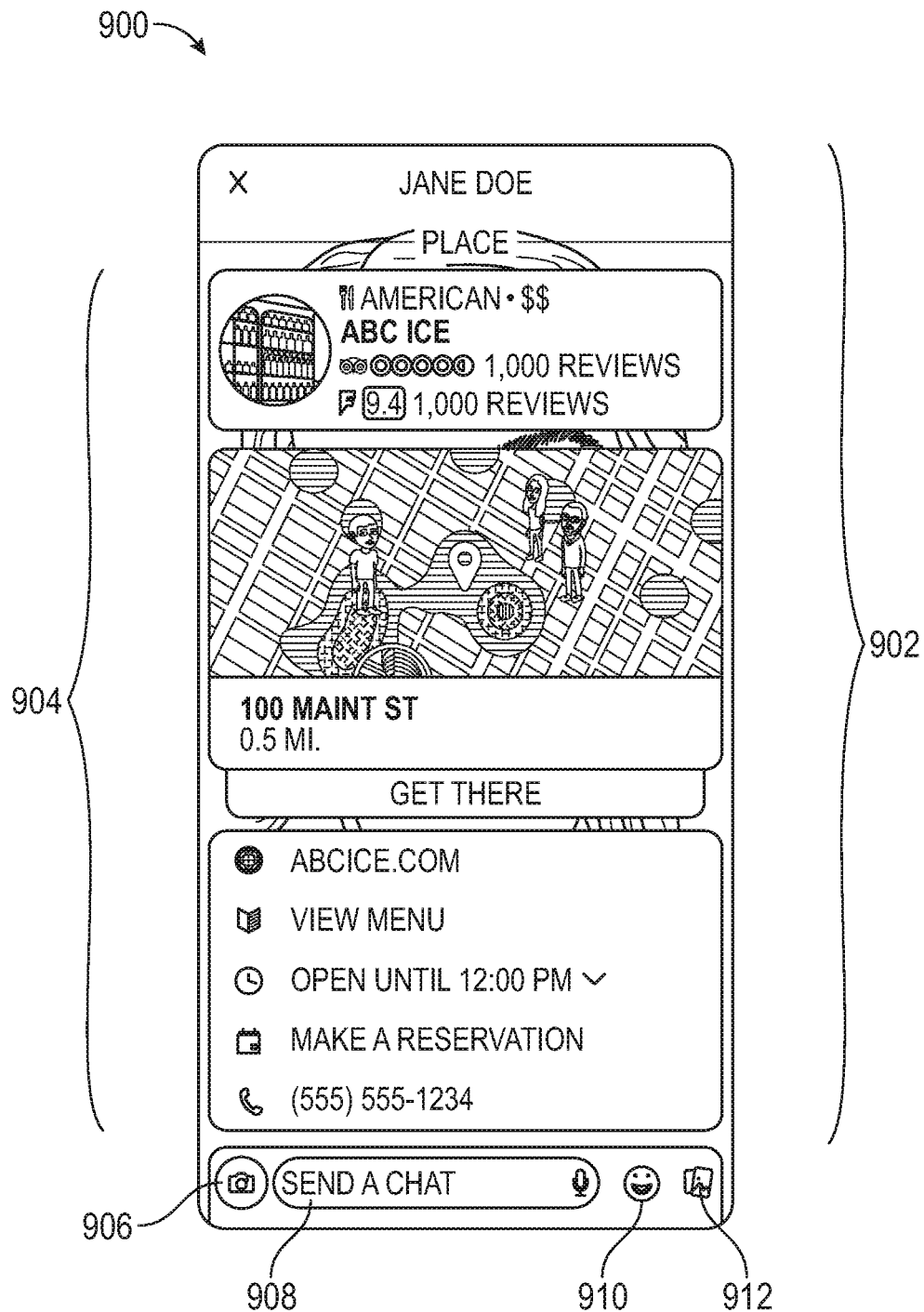
FIG. 9 illustrates a user interface 900 in accordance with one embodiment.

FIG. 9 illustrates example a user interface 900 for displaying expanded context cards corresponding to a single type of context, in accordance with some example embodiments. The user interface 900 includes a media content item 902, for example, which is associated with a single type of context corresponding to a venue (e.g., restaurant). As noted above, a venue type of context may generally include supplemental information to be displayed across multiple context cards.

In the example of FIG. 9, the expanded context cards 904 may be displayed in response to user selection of collapsed context cards (e.g., similar to the collapsed context cards 702 of FIG. 7) that were initially presented in response to user selection of a reply element (e.g., similar to the reply element 606 of FIG. 6). As shown in FIG. 9, the messaging client 104 provides for display of the expanded context cards 904 without display of a keyboard interface on the same screen (e.g., similar to FIG. 8).

The user interface 900 displays the expanded context cards 904 as an overlay with respect to the media content item 902. The expanded context cards 904 include different types of supplemental information regarding the venue associated with the media content item 902. In the example of FIG. 9, the supplemental information includes a first context card linking to a review profile for the venue (e.g., including ratings/reviews), a second context card with map information showing users/friends who may be proximate to the venue (e.g., based on information provided by the above-described social network server 122 and/or map system 208), and a third context card linking to general information for the venue (e.g., contact information, menu, a user-selectable button for making a reservation). It is possible for the messaging client 104 to provide other types of supplemental information instead of, or in addition to, those presented by the expanded context cards 904.

In one or more embodiments, the user interface 900 includes an input box 908, user selection of which may cause the messaging client 104 to surface a keyboard interface for user input of text to include in a message. In addition, the user interface 900 includes: an image capture element 906 for activating the device camera to capture an image/video for including in a message with media content; a sticker selection element 910 for selecting from among a set of available stickers (e.g., generic stickers or personalized avatar-based stickers) to include in a reply message; and/or a photo selection element 912 for selecting an image/video selected from a photo library.

Figure 10:
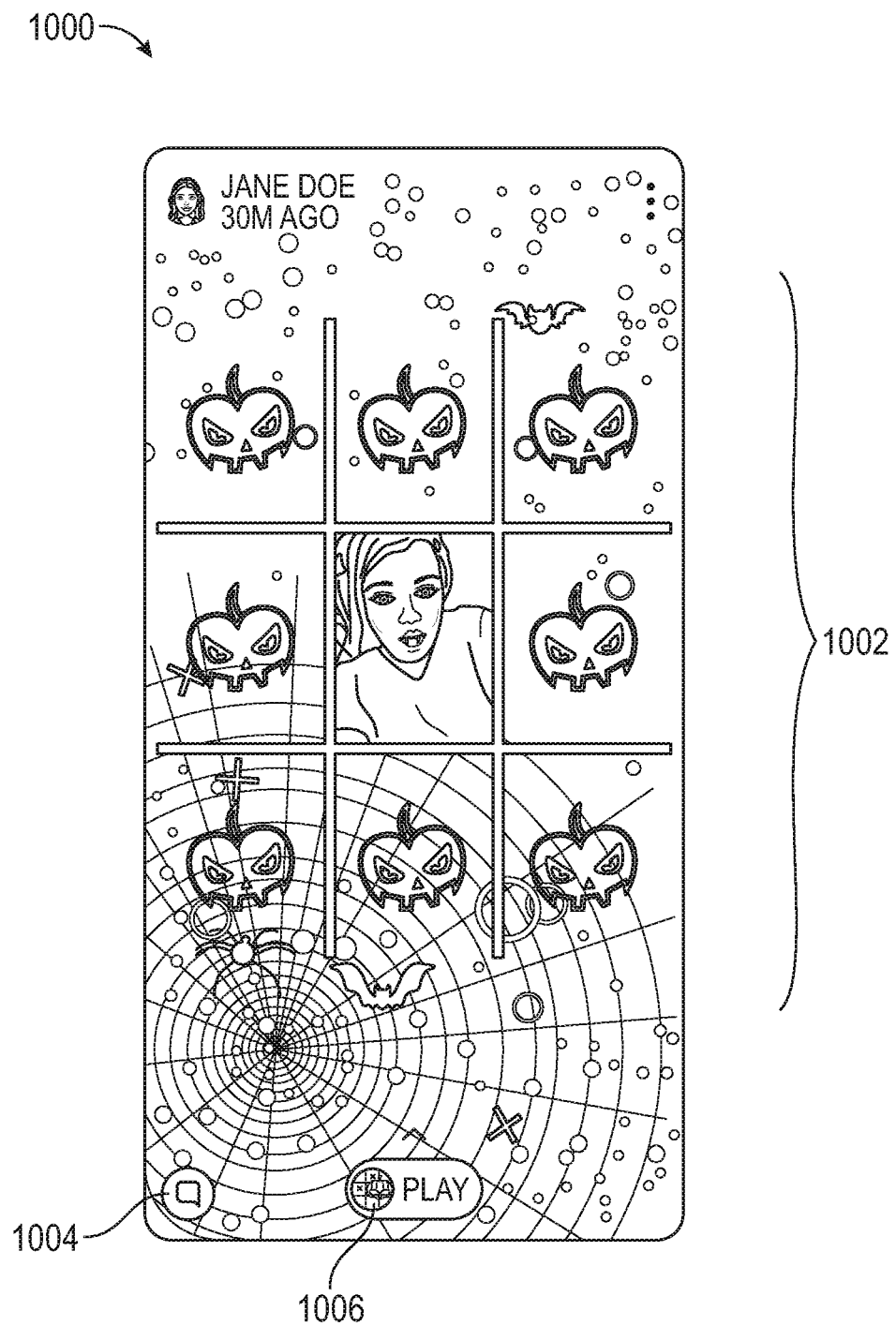
FIG. 10 illustrates an example user interface for displaying a media content item and a first second format for a reply element, in accordance with some example embodiments.

FIG. 10 illustrates an example user interface 1000 for displaying a media content item, together with a reply element in a second format, in accordance with some example embodiments. In the example of FIG. 10, the user interface 1000 includes display of a media content item 1002, a reply element 1004 and a context interaction element 1006. For example, the media content item 1002 is displayed on the client device 102 of first user, and corresponds to a message with media content provided by a second user.

The reply element 1004 is displayed in a second format. As discussed above with respect to FIG. 5, the second format for the reply element corresponds with a media content item that is associated with a predefined (e.g., or prioritized) type of context. In the example of FIG. 10; the predefined type of context corresponds to a game. As noted above, the second format for the reply element may correspond to a less prominent (e.g., smaller) icon/button positioned in a bottom corner (e.g.; left corner) of the screen. The reply element 1004 may be user-selectable via a predefined gesture, such as a tap gesture.

In response to user selection of the reply element 1004, the messaging client 104 displays a keyboard interface together with one or more context card(s). As discussed below with respect to the example of FIG. 11, the media content item 1002 is associated with a single type of context (e.g., a game), and is represented by a single context card.

The user interface 1000 further includes a context interaction element 1006, which is user-selectable to initiate user interaction with respect to the media content item. In the example of FIG. 10, user selection of the user interface 1000 may cause the messaging client 104 to initiate a corresponding game between respective devices of the first and second users. As shown, the context interaction element may be displayed as a more prominent (e.g., larger) icon/button, and may be positioned in a bottom center of the device screen.

Figure 11:
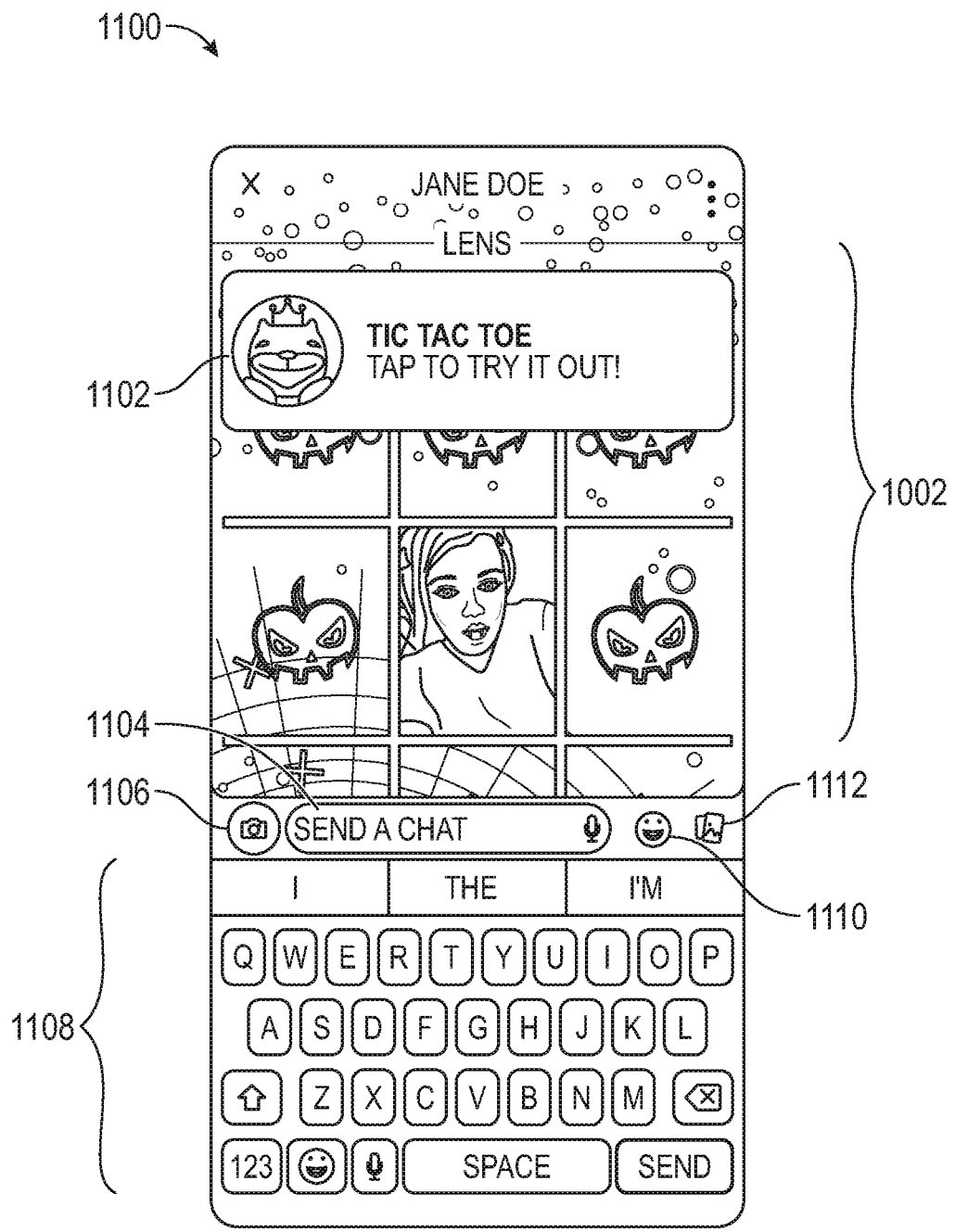
FIG. 11 illustrates an example user interface for displaying a keyboard interface together with a single context card corresponding to a single type of context, in accordance with some example embodiments.

FIG. 11 illustrates an example user interface 1100 for displaying a keyboard and a single context card corresponding to a single type of context, in accordance with some example embodiments. In one or more embodiments, the user interface 1100 is displayed in response to user selection of the reply element 1004 in FIG. 10.

The user interface 1100 includes contextual information displayed as a single context card 1102. As noted above with respect to the example of FIG. 10; the media content item 602 is associated with a single type of context corresponding to a game (e.g., tic tac toe). In one or more embodiments, the single context card 1102 is user-selectable (e.g., via a tap gesture), for example, to initiate the game between the first user and the second user. Alternatively or in addition, user selection of the single context card 1102 may cause the messaging client 104 to provide additional information regarding the game (e.g., by displaying a profile page for the game).

The user interface 1100 further includes an input box 1104 configured for user input of message content to include in a reply message. For example, the user input may be provided by one or more of: a keyboard interface 1108 for user input of text within the input box 1104; an image capture element 1106 for activating the device camera to capture an image/video for including in a message with media content; a sticker selection element 1110 for selecting from among a set of available stickers (e.g., generic stickers or personalized avatar-based stickers) to include in a reply message; and/or a photo selection element 1112 for selecting an image/video selected from a photo library associated with the first user.

In one or more embodiments, the keyboard interface 1108 is displayed in a first preset area corresponding to a bottom part of the screen the client device 102. On the other hand, the single context card 1102 is displayed in a second preset area corresponding to a top part of the screen.

Figure 12:
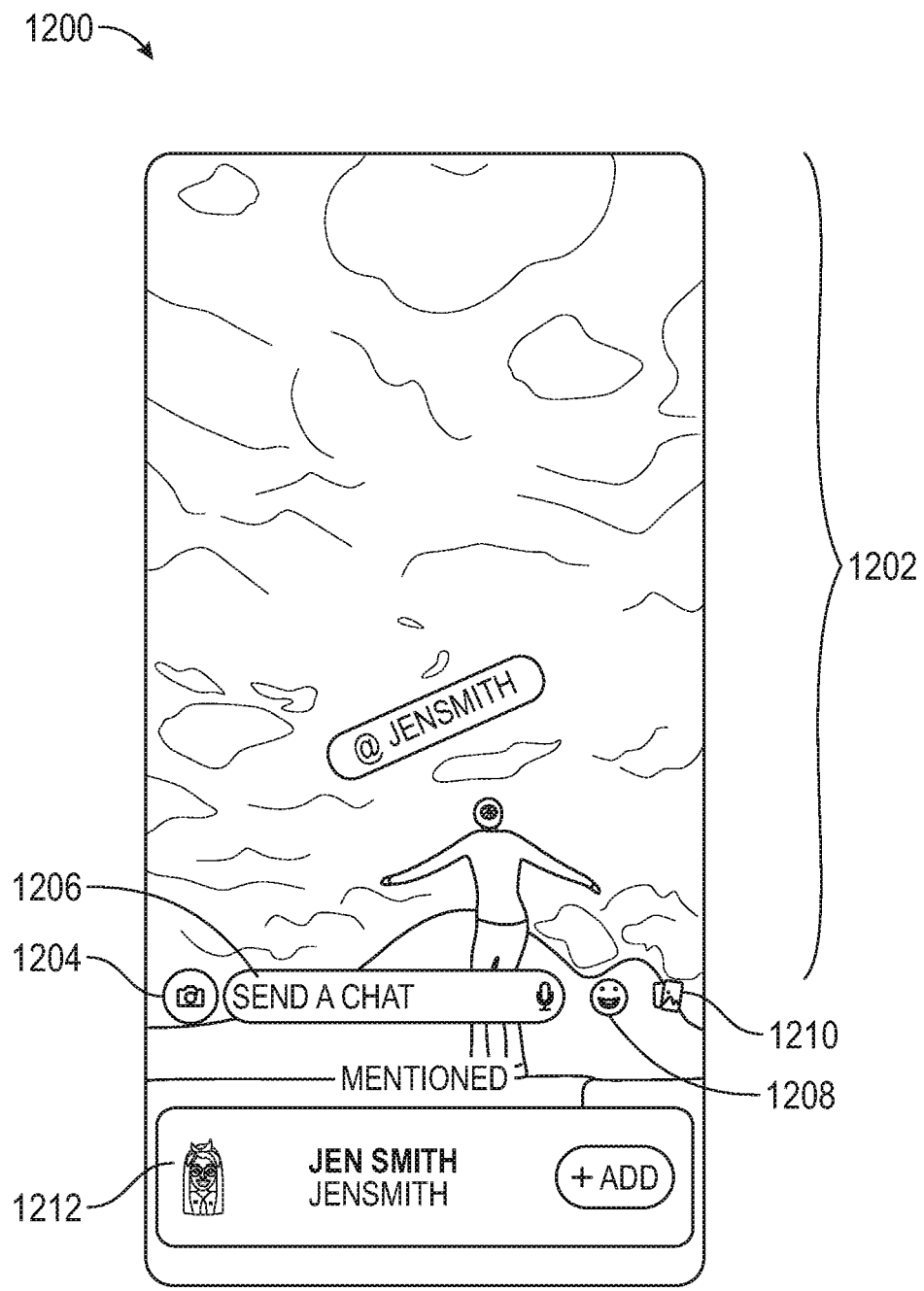
FIG. 12 illustrates another example user interface for displaying a context card, in accordance with some example embodiments.

FIG. 12 illustrates another example user interface 1200 for displaying a context card, in accordance with some example embodiments. As noted above with respect to FIGS. 7-9 and 11, one or more context card(s) are presented in a top portion of the screen, for example, in response to user selection of a reply element. However, in FIG. 12, the context card 1212 is displayed at a bottom portion of the screen.

In one or more embodiments, context card(s) are presented at a bottom portion (instead of at a top portion) in response to user selection of an additional action(s) element (e.g., additional action(s) element 608 of FIG. 6), or selection of another interface element (e.g., for displaying information about a user referenced in a media content item). As discussed above with respect to FIG. 6, the additional action(s) element 608 is displayed in a less prominent manner than the reply element 606, and is user-selectable to display context card(s) without presentation of the keyboard interface 704. Thus, in a case where the a media content item (e.g., the media content item 1202) is not associated with a predefined (e.g., prioritized) type of context, the messaging client 104 provides for displaying corresponding context cards (e.g., the context card 1212) at a bottom portion of the screen.

In the example of FIG. 12, the context card 1212 corresponds to a user profile that is referenced within the media content item 1202. With respect to being displayed at a bottom portion of the screen, the context card 1212 may be displayed below other interface elements, such as but not limited to: an image capture element 1204 for activating the device camera to capture an image/video for including in a message with media content; an input box 1206 user selection of which may cause the messaging client 104 to surface a keyboard interface for user input of text to include in a message; a sticker selection element 1208 for selecting from among a set of available stickers (e.g.; generic stickers or personalized avatar-based stickers) to include in a reply message; and/or a photo selection element 1210 for selecting an image/video selected from a photo library. In one or more embodiments, interface elements 1204-1210 are presented when responding to a public chat (e.g., a response to a Story that was broadcast), and are not presented when responding to a private chat (e.g., a response to a message and/or Story sent directly between users).

Figure 13:
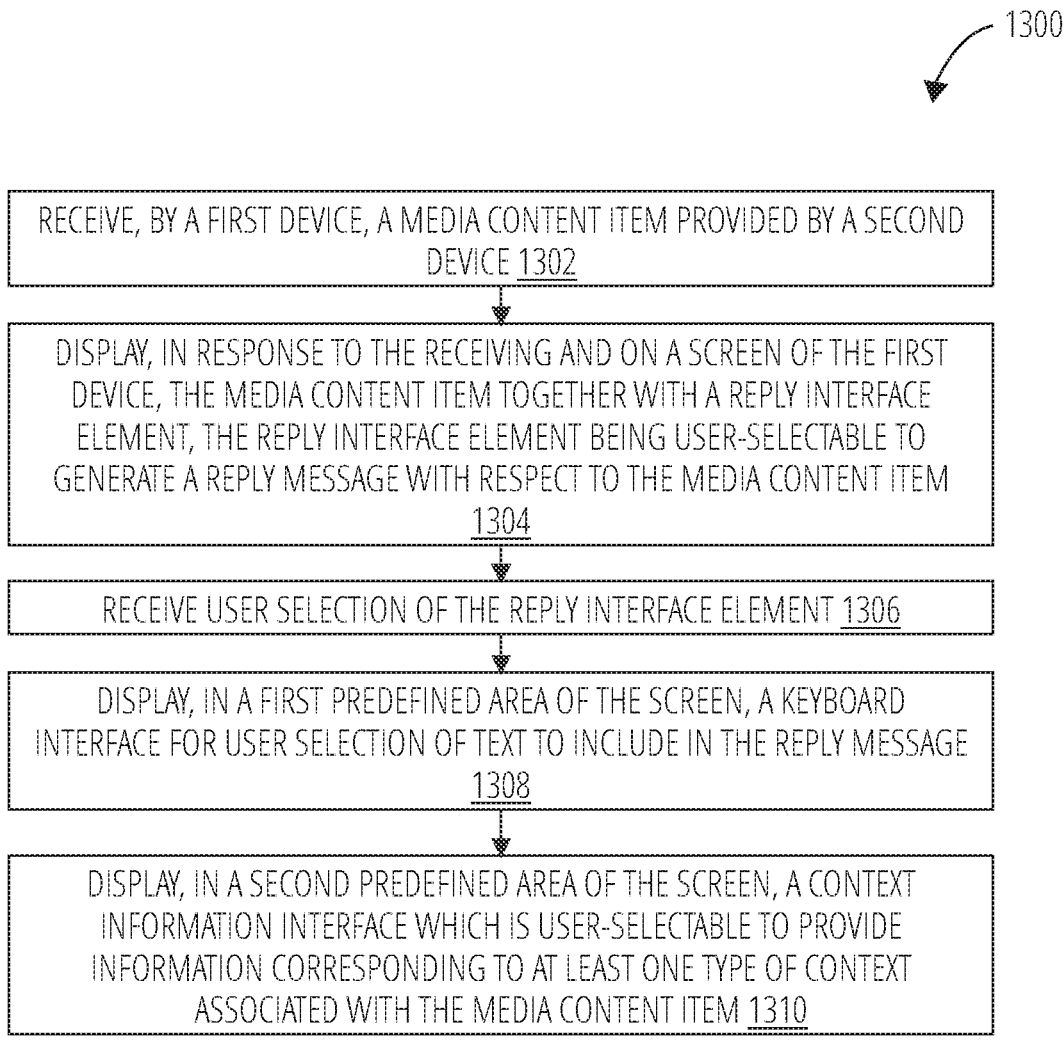
FIG. 13 is a flowchart illustrating a process for providing contextual information with a keyboard interface, in accordance with some example embodiments.

FIG. 13 is a flowchart illustrating a process 1300 for providing contextual information with a keyboard interface, in accordance with some example embodiments. For explanatory purposes, the process 1300 is primarily described herein with reference to the messaging client 104 of the client device 102, and the messaging server system 108 of FIG. 1. However, one or more blocks (or operations) of the process 1300 may be performed by one or more other components, and/or by other suitable devices. Further for explanatory purposes, the blocks (or operations) of the process 1300 are described herein as occurring in serial, or linearly. However, multiple blocks (or operations) of the process 1300 may occur in parallel or concurrently. In addition, the blocks (or operations) of the process 1300 need not be performed in the order shown and/or one or more blocks (or operations) of the process 1300 need not be performed and/or can be replaced by other operations. The process 1300 may be terminated when its blocks (or operations) are completed. In addition, the process 1300 may correspond to a method, a procedure, an algorithm, etc.

At block 1302, the messaging client 104 running on a first device (e.g., a client device 102) receives a media content item provided by a second device (e.g., another client device 102). The messaging client 104 displays, in response to the receiving and on a screen of the messaging client 104, the media content item together with a reply element, the reply element being user-selectable to generate a reply message with respect to the media content item (block 1304).

The messaging client 104 may determine whether at least one type of context associated with the media content item corresponds to a predefined (e.g., prioritized) type of context. The predefined type of context may correspond to commerce, a non-sponsored attachment, a game, or a user profile referenced within the media content item.

In one or more embodiments, in a case where the at least one type of context corresponds to the predefined type of context, the messaging client 104 displays the reply element in a first format (e.g., at a bottom corner of the screen). In a case where the at least one type of context item does not correspond to the predefined type of context, the messaging client 104 displays the reply element in a second format (e.g., at a bottom center of the screen).

The messaging client 104 receives user selection of the reply element (block 1306). In response to receiving the user selection, the messaging client 104 displays, in a first preset area of the screen, a keyboard interface for user selection of text to include in the reply message (block 1308). The messaging client 104 further displays, in a second preset area of the screen, a context information interface which is user-selectable to provide information corresponding to the at least one type of context associated with the media content item (block 1310).

The keyboard interface and the context information interface may be displayed as overlays with respect to the media content item. The second preset area may be positioned above the first preset area on the screen.

The messaging client 104 may determine that the at least one type of context corresponds to multiple types of context to be represented by multiple context cards, and may display, in response to the determining, the context information interface as the multiple context cards. The multiple context cards may be displayed as a stack of cards. The messaging client 104 may receive user input corresponding to selection of the stack of cards, and change, in response to receiving the user input, display of the multiple context cards from the stack of cards to a row or column of cards.

The messaging client 104 may determine that the at least one type of context is a single type of context to be represented by a single context card, and display, in response to the determining, the context information interface as the single context card. Alternatively or in addition, the messaging client 104 may determine that the at least one type of context is a single type of context to be represented by multiple context cards, and display, in response to the determining, the context information interface as the multiple context cards. The multiple context cards may be displayed as a row or column of cards.

Figure 14:
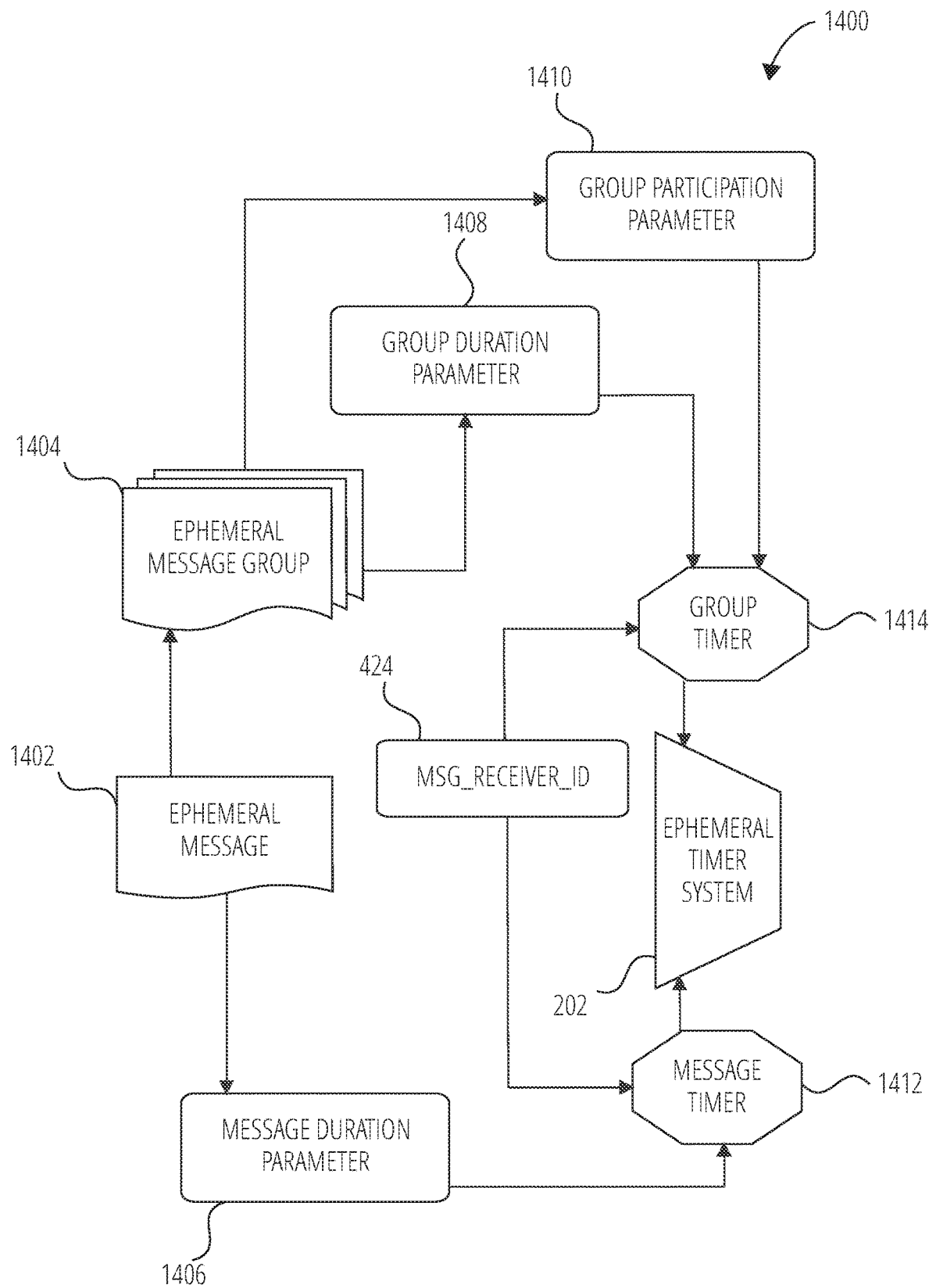
FIG. 14 is a flowchart for an access-limiting process, in accordance with some example embodiments.

FIG. 14 is a schematic diagram illustrating an access-limiting process 1400, in terms of which access to content (e.g., an ephemeral message 1402, and associated multimedia payload of data) or a content collection (e.g., an ephemeral message group 1404) may be time-limited (e.g., made ephemeral).

An ephemeral message 1402 is shown to be associated with a message duration parameter 1406, the value of which determines an amount of time that the ephemeral message 1402 will be displayed to a receiving user of the ephemeral message 1402 by the messaging client 104. In one example, an ephemeral message 1402 is viewable by a receiving user for up to a maximum of 10 seconds, depending on the amount of time that the sending user specifies using the message duration parameter 1406.

The message duration parameter 1406 and the message receiver identifier 424 are shown to be inputs to a message timer 1412, which is responsible for determining the amount of time that the ephemeral message 1402 is shown to a particular receiving user identified by the message receiver identifier 424. In particular, the ephemeral message 1402 will only be shown to the relevant receiving user for a time period determined by the value of the message duration parameter 1406. The message timer 1412 is shown to provide output to a more generalized ephemeral timer system 202, which is responsible for the overall timing of display of content (e.g., an ephemeral message 1402) to a receiving user.

The ephemeral message 1402 is shown in FIG. 14 to be included within an ephemeral message group 1404 (e.g., a collection of messages in a personal Story, or an event Story). The ephemeral message group 1404 has an associated group duration parameter 1408, a value of which determines a time duration for which the ephemeral message group 1404 is presented and accessible to users of the messaging system 100. The group duration parameter 1408, for example, may be the duration of a music concert, where the ephemeral message group 1404 is a collection of content pertaining to that concert. Alternatively, a user (either the owning user or a curator user) may specify the value for the group duration parameter 1408 when performing the setup and creation of the ephemeral message group 1404.

Additionally, each ephemeral message 1402 within the ephemeral message group 1404 has an associated group participation parameter 1410, a value of which determines the duration of time for which the ephemeral message 1402 will be accessible within the context of the ephemeral message group 1404. Accordingly, a particular ephemeral message group 1404 may "expire" and become inaccessible within the context of the ephemeral message group 1404, prior to the ephemeral message group 1404 itself expiring in terms of the group duration parameter 1408. The group duration parameter 1408, group participation parameter 1410, and message receiver identifier 424 each provide input to a group timer 1414, which operationally determines, firstly, whether a particular ephemeral message 1402 of the ephemeral message group 1404 will be displayed to a particular receiving user and, if so, for how long. Note that the ephemeral message group 1404 is also aware of the identity of the particular receiving user as a result of the message receiver identifier 424.

Accordingly, the group timer 1414 operationally controls the overall lifespan of an associated ephemeral message group 1404, as well as an individual ephemeral message 1402 included in the ephemeral message group 1404. In one example, each and every ephemeral message 1402 within the ephemeral message group 1404 remains viewable and accessible for a time period specified by the group duration parameter 1408. In a further example, a certain ephemeral message 1402 may expire, within the context of ephemeral message group 1404, based on a group participation parameter 1410. Note that a message duration parameter 1406 may still determine the duration of time for which a particular ephemeral message 1402 is displayed to a receiving user, even within the context of the ephemeral message group 1404. Accordingly, the message duration parameter 1406 determines the duration of time that a particular ephemeral message 1402 is displayed to a receiving user, regardless of whether the receiving user is viewing that ephemeral message 1402 inside or outside the context of an ephemeral message group 1404.

The ephemeral timer system 202 may furthermore operationally remove a particular ephemeral message 1402 from the ephemeral message group 1404 based on a determination that it has exceeded an associated group participation parameter 1410. For example, when a sending user has established a group participation parameter 1410 of 24 hours from posting, the ephemeral timer system 202 will remove the relevant ephemeral message 1402 from the ephemeral message group 1404 after the specified 24 hours. The ephemeral timer system 202 also operates to remove an ephemeral message group 1404 when either the group participation parameter 1410 for each and every ephemeral message 1402 within the ephemeral message group 1404 has expired, or when the ephemeral message group 1404 itself has expired in terms of the group duration parameter 1408.

In certain use cases, a creator of a particular ephemeral message group 1404 may specify an indefinite group duration parameter 1408. In this case, the expiration of the group participation parameter 1410 for the last remaining ephemeral message 1402 within the ephemeral message group 1404 will determine when the ephemeral message group 1404 itself expires. In this case, a new ephemeral message 1402, added to the ephemeral message group 1404, with a new group participation parameter 1410, effectively extends the life of an ephemeral message group 1404 to equal the value of the group participation parameter 1410.

Responsive to the ephemeral timer system 202 determining that an ephemeral message group 1404 has expired (e.g., is no longer accessible), the ephemeral timer system 202 communicates with the messaging system 100 (and, for example, specifically the messaging client 104) to cause an indicium (e.g., an icon) associated with the relevant ephemeral message group 1404 to no longer be displayed within a user interface of the messaging client 104. Similarly, when the ephemeral timer system 202 determines that the message duration parameter 1406 for a particular ephemeral message 1402 has expired, the ephemeral timer system 202 causes the messaging client 104 to no longer display an indicium (e.g., an icon or textual identification) associated with the ephemeral message 1402.

Figure 15:
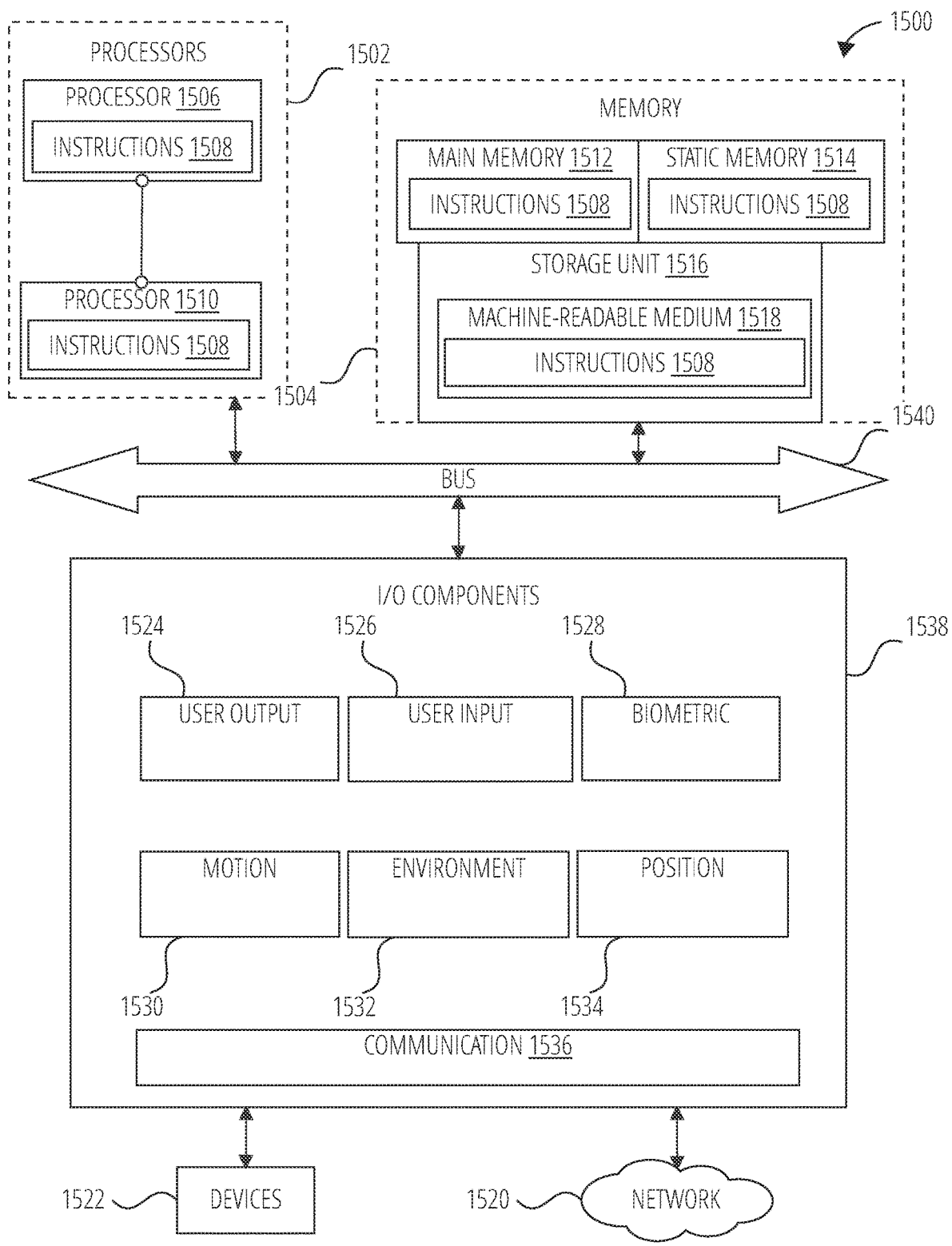
FIG. 15 is a diagrammatic representation of a machine in the form of a computer system within which a set of instructions may be executed for causing the machine to perform any one or more of the methodologies discussed herein, in accordance with some example embodiments.

FIG. 15 is a diagrammatic representation of the machine 1500 within which instructions 1508 (e.g., software, a program, an application, an applet, an app, or other executable code) for causing the machine 1500 to perform any one or more of the methodologies discussed herein may be executed. For example, the instructions 1508 may cause the machine 1500 to execute any one or more of the methods described herein. The instructions 1508 transform the general, non-programmed machine 1500 into a particular machine 1500 programmed to carry out the described and illustrated functions in the manner described. The machine 1500 may operate as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1508, sequentially or otherwise, that specify actions to be taken by the machine 1500. Further, while only a single machine 1500 is illustrated, the term "machine" shall also be taken to include a collection of machines that individually or jointly execute the instructions 1508 to perform any one or more of the methodologies discussed herein. The machine 1500, for example, may comprise the client device 102 or any one of a number of server devices forming part of the messaging server system 108. In some examples, the machine 1500 may also comprise both client and server systems, with certain operations of a particular method or algorithm being performed on the server-side and with certain operations of the particular method or algorithm being performed on the client-side.

The machine 1500 may include processors 1502, memory 1504, and input/output I/O components 1538, which may be configured to communicate with each other via a bus 1540. In an example, the processors 1502 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1506 and a processor 1510 that execute the instructions 1508. The term "processor" is intended to include multi-core processors that may comprise two or more independent processors (sometimes referred to as "cores") that may execute instructions contemporaneously. Although FIG. 15 shows multiple processors 1502, the machine 1500 may include a single processor with a single-core, a single processor with multiple cores (e.g., a multi-core processor), multiple processors with a single core, multiple processors with multiples cores, or any combination thereof.

The memory 1504 includes a main memory 1512, a static memory 1514, and a storage unit 1516, both accessible to the processors 1502 via the bus 1540. The main memory 1504, the static memory 1514, and storage unit 1516 store the instructions 1508 embodying any one or more of the methodologies or functions described herein. The instructions 1508 may also reside, completely or partially, within the main memory 1512, within the static memory 1514, within the machine-readable medium 1518 within the storage unit 1516, within at least one of the processors 1502 (e.g., within the Processor's cache memory), or any suitable combination thereof, during execution thereof by the machine 1500.

The I/O components 1538 may include a wide variety of components to receive input, provide output, produce output, transmit information, exchange information, capture measurements, and so on. The specific I/O components 1538 that are included in a particular machine will depend on the type of machine. For example, portable machines such as mobile phones may include a touch input device or other such input mechanisms, while a headless server machine will likely not include such a touch input device. It will be appreciated that the I/O components 1538 may include many other components that are not shown in FIG. 15. In various examples, the I/O components 1538 may include user output components 1524 and user input components 1526. The user output components 1524 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1526 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1538 may include biometric components 1528, motion components 1530, environmental components 1532, or position components 1534, among a wide array of other components. For example, the biometric components 1528 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1530 include acceleration sensor components (e.g., accelerometer), gravitation sensor components, rotation sensor components (e.g., gyroscope).

The environmental components 1532 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1534 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1538 further include communication components 1536 operable to couple the machine 1500 to a network 1520 or devices 1522 via respective coupling or connections. For example, the communication components 1536 may include a network interface Component or another suitable device to interface with the network 1520. In further examples, the communication components 1536 may include wired communication components, wireless communication components, cellular communication components, Near Field Communication (NFC) components, Bluetooth® components (e.g., Bluetooth® Low Energy), components, and other communication components to provide communication via other modalities. The devices 1522 may be another machine or any of a wide variety of peripheral devices (e.g., a peripheral device coupled via a USB).

Moreover, the communication components 1536 may detect identifiers or include components operable to detect identifiers. For example, the communication components 1536 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1536, such as location via Internet Protocol (IP) geolocation, location via Wi-Fi® signal triangulation, location via detecting an NFC beacon signal that may indicate a particular location, and so forth.

The various memories (e.g., main memory 1512, static memory 1514, and memory of the processors 1502) and storage unit 1516 may store one or more sets of instructions and data structures (e.g., software) embodying or used by any one or more of the methodologies or functions described herein. These instructions (e.g., the instructions 1508), when executed by processors 1502, cause various operations to implement the disclosed examples.

The instructions 1508 may be transmitted or received over the network 1520, using a transmission medium, via a network interface device (e.g., a network interface component included in the communication components 1536) and using any one of several well-known transfer protocols (e.g., hypertext transfer protocol (HTTP)). Similarly, the instructions 1508 may be transmitted or received using a transmission medium via a coupling (e.g., a peer-to-peer coupling) to the devices 1522.

Figure 16:
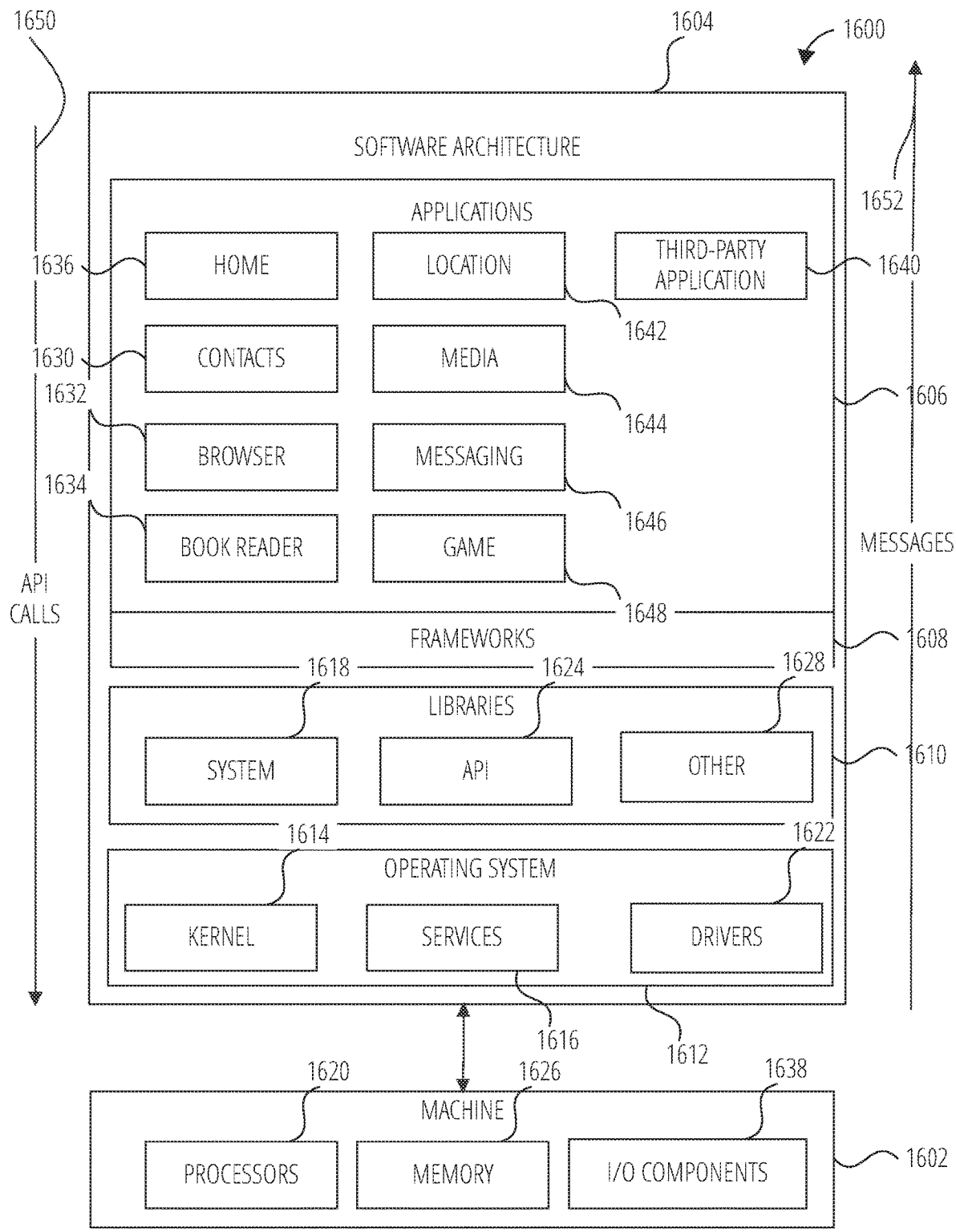
FIG. 16 is a block diagram showing a software architecture within which examples may be implemented, in accordance with some example embodiments.

FIG. 16 is a block diagram 1600 illustrating a software architecture 1604, which can be installed on any one or more of the devices described herein. The software architecture 1604 is supported by hardware such as a machine 1602 that includes processors 1620, memory 1626, and I/O components 1638. In this example, the software architecture 1604 can be conceptualized as a stack of layers, where each layer provides a particular functionality. The software architecture 1604 includes layers such as an operating system 1612, libraries 1610, frameworks 1608, and applications 1606. Operationally, the applications 1606 invoke API calls 1650 through the software stack and receive messages 1652 in response to the API calls 1650.

The operating system 1612 manages hardware resources and provides common services. The operating system 1612 includes, for example, a kernel 1614, services 1616, and drivers 1622. The kernel 1614 acts as an abstraction layer between the hardware and the other software layers. For example, the kernel 1614 provides memory management, processor management (e.g., scheduling), component management, networking, and security settings, among other functionality. The services 1616 can provide other common services for the other software layers. The drivers 1622 are responsible for controlling or interfacing with the underlying hardware. For instance, the drivers 1622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1610 provide a common low-level infrastructure used by the applications 1606. The libraries 1610 can include system libraries 1618 (e.g., C standard library) that provide functions such as memory allocation functions, string manipulation functions, mathematic functions, and the like. In addition, the libraries 1610 can include API libraries 1624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1610 can also include a wide variety of other libraries 1628 to provide many other APIs to the applications 1606.

The frameworks 1608 provide a common high-level infrastructure that is used by the applications 1606. For example, the frameworks 1608 provide various graphical user interface (GUI) functions, high-level resource management, and high-level location services. The frameworks 1608 can provide a broad spectrum of other APIs that can be used by the applications 1606, some of which may be specific to a particular operating system or platform.

In an example, the applications 1606 may include a home application 1636, a contacts application 1630, a browser application 1632, a book reader application 1634, a location application 1642, a media application 1644, a messaging application 1646, a game application 1648, and a broad assortment of other applications such as a third-party application 1640. The applications 1606 are programs that execute functions defined in the programs. Various programming languages can be employed to create one or more of the applications 1606, structured in a variety of manners, such as object-oriented programming languages (e.g., Objective-C, Java, or C++) or procedural programming languages (e.g., C or assembly language). In a specific example, the third-party application 1640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1640 can invoke the API calls 1650 provided by the operating system 1612 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (TN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed, Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:
1. A method, comprising:
receiving, by a first device, a media content item provided by a second device, the media content item being associated with at least one type of context;
displaying, on a screen of the first device and upon determining that the at least one type of context corresponds to a prioritized type of context, the media content item together with a reply element in a first format, the reply element being user-selectable to generate a reply message with respect to the media content item, the prioritized type of context having been previously specified by an administrator as prioritized relative to other types of context, wherein the prioritized type of context corresponds to commerce, a non-sponsored attachment, a game, or a user profile referenced within the media content item, and
wherein the other types of context correspond to an invitation to a group/event chat, an invitation to a private Story, music, an augmented reality content item, a venue, a sponsored attachment or a third-party application;
displaying, on the screen and upon determining that the at least one type of context does not correspond to the prioritized type of context, the media content item together with the reply element in a second format which is larger and in a different position than the first format;
receiving user selection of the reply element; and
in response to receiving the user selection,
displaying, in a first preset area of the screen, a keyboard interface for user selection of message content to include in the reply message, and
displaying, in a second preset area of the screen, a context information interface for presenting predefined contex- tual information which corresponds to the at least one type of context and which relates to the media content item.

2. The method of claim 1, wherein the first format corresponds with displaying the reply element in a bottom corner of the screen, and
wherein the second format corresponds with displaying the reply element in a bottom center of the screen.

3. The method of claim 1, wherein the keyboard interface and the context information interface are displayed as overlays with respect to the media content item.

4. The method of claim 1, wherein the second preset area is positioned above the first preset area on the screen.

5. The method of claim 1, further comprising:
determining that the at least one type of context corresponds to multiple types of context; and
displaying, in response to the determining, the context information interface as multiple context cards.

6. The method of claim 5, wherein the multiple context cards are displayed as a stack of cards.

7. The method of claim 6, further comprising:
receiving user input corresponding to selection of the stack of cards; and
changing, in response to receiving the user input, display of the multiple context cards from the stack of cards to a row or column of cards, each card within the row or column being user-selectable to present supplemental information associated with the card.

8. The method of claim 1, further comprising:
determining that the at least one type of context is a single type of context to be represented by a single context card; and
displaying, in response to the determining, the context information interface as the single context card, which is user-selectable to present supplemental information associated with the single context card.

9. The method of claim 1, further comprising:
determining that the at least one type of context is a single type of context to be represented by multiple context cards; and
displaying, in response to the determining, the context information interface as the multiple context cards.

10. The method of claim 9, wherein the multiple context cards are displayed as a row or column of cards, each card within the row or column being user-selectable to present supplemental information associated with the card.

11. A device, the device comprising:
a processor; and
a memory storing instructions that, when executed by the processor, configure the processor to:
receive a media content item provided by a second device, the media content item being associated with at least one type of context;
display, on a screen of the device and upon determining that the at least one type of context corresponds to a prioritized type of context, the media content item together with a reply element in a first format, the reply element being user-selectable to generate a reply message with respect to the media content item, the prioritized type of context having been previously specified by an administrator as prioritized relative to other types of context, wherein the prioritized type of context corresponds to commerce, a non-sponsored attachment, a game, or a user profile referenced within the media content item, and
wherein the other types of context correspond to an invitation to a group/event chat, an invitation to a private Story, music, an augmented reality content item, a venue, a sponsored attachment or a third-party application;
display, on the screen and upon determining that the at least one type of context does not correspond to the prioritized type of context, the media content item together with the reply element in a second format which is larger and in a different position than the first format;
receive user selection of the reply element; and
in response to receiving the user selection,
display, in a first preset area of the screen, a keyboard interface for user selection of message content to include in the reply message, and
display, in a second preset area of the screen, a context information interface for presenting predefined contextual information which corresponds to the at least one type of context and which relates to the media content item.

12. The device of claim 11, wherein the first format corresponds with displaying the reply element in a bottom corner of the screen, and
wherein the second format corresponds with displaying the reply element in a bottom center of the screen.

13. The device of claim 11, wherein the keyboard interface and the context information interface are displayed as overlays with respect to the media content item.

14. The device of claim 11, wherein the second preset area is positioned above the first preset area on the screen.

15. The device of claim 11, wherein the instructions further configure the processor to:
determine that the at least one type of context corresponds to multiple types of context; and
display, in response to the determining, the context information interface as multiple context cards.

16. A non-transitory computer-storage medium, the non-transitory computer-storage medium including instructions that when executed by a computer, cause the computer to:
receive, by a first device, a media content item provided by a second device, the media content item being associated with at least one type of context;
display, on a screen of the first device and upon determining that the at least one type of context corresponds to a prioritized type of context, the media content item together with a reply element in a first format, the reply element being user-selectable to generate a reply message with respect to the media content item, the prioritized type of context having been previously specified by an administrator as prioritized relative to other types of context, wherein the prioritized type of context corresponds to commerce, a non-sponsored attachment, a game, or a user profile referenced within the media content item, and
wherein the other types of context correspond to an invitation to a group/event chat, an invitation to a private Story, music, an augmented reality content item, a venue, a sponsored attachment or a third-party application;
display, on the screen and upon determining that the at least one type of context does not correspond to the prioritized type of context, the media content item together with the reply element in a second format which is larger and in a different position than the first format;
receive user selection of the reply element; and
in response to receiving the user selection, display, in a first preset area of the screen, a keyboard interface for user selection of message content to include in the reply message, and display, in a second preset area of the screen, a context information interface for presenting predefined contextual information which corresponds to the at least one type of context and which relates to the media content item.

* * * * *